United States Patent
Nakate

(10) Patent No.: US 8,335,384 B2
(45) Date of Patent: Dec. 18, 2012

(54) APPARATUS FOR AND METHOD OF PROCESSING IMAGE INFORMATION TO GROUP IMAGE DATA PIECES BASED ON SHOOTING INTERVALS

(75) Inventor: Shin Nakate, Yokohama (JP)

(73) Assignee: JVC Kenwood Corporation, Yokohama-shi, Kanagawa (JP)

( * ) Notice: Subject to any disclaimer, the term of this patent is extended or adjusted under 35 U.S.C. 154(b) by 1089 days.

(21) Appl. No.: 12/232,864

(22) Filed: Sep. 25, 2008

(65) Prior Publication Data

US 2009/0087104 A1    Apr. 2, 2009

(30) Foreign Application Priority Data

Sep. 27, 2007 (JP) ................. 2007-251675
Jun. 13, 2008 (JP) ................. 2008-155394

(51) Int. Cl.
*G06K 9/00* (2006.01)
(52) U.S. Cl. ..................... 382/225; 382/305
(58) Field of Classification Search .......... None
See application file for complete search history.

(56) References Cited

U.S. PATENT DOCUMENTS

| 6,606,411 B1* | 8/2003 | Loui et al. ............... 382/224 |
| 2006/0193538 A1* | 8/2006 | Vronay et al. ............ 382/305 |
| 2006/0282443 A1* | 12/2006 | Hanagata .................. 707/100 |
| 2008/0292212 A1* | 11/2008 | Ozaki ..................... 382/284 |
| 2009/0003799 A1* | 1/2009 | Inoha et al. .............. 386/95 |

FOREIGN PATENT DOCUMENTS

JP    2007-094762    4/2007
WO    WO 2006022289 A1 *  3/2006

* cited by examiner

*Primary Examiner* — Brian P Werner
(74) *Attorney, Agent, or Firm* — Nath, Goldberg & Meyer; Jerald L. Meyer; Stanley N. Protigal

(57) ABSTRACT

An apparatus for processing image information regarding image data pieces each having retrievable information including shooting time and a shooting interval includes a grouping unit configured to group the image data pieces, which are arranged in order of the shooting time, by sequentially carrying out grouping steps that each divide or merge the image data pieces into groups according to the shooting intervals, an evaluation unit configured to calculate a score for each of the grouping steps according to one or a plurality of predetermined evaluation items, and a determination unit configured to determine a specific one of the grouping steps according to the calculated scores.

23 Claims, 23 Drawing Sheets

FIG. 3

| | | 121 |
|---|---|---|
| 121a | 121b | 121c |

| FILE NAME | SHOOTING START DATE / TIME | SHOOTING DURATION |
|---|---|---|
| File1001 | 2007/6/21 10:23:36 | 0:03:04 |
| File1002 | 2007/6/21 10:40:20 | 0:06:13 |
| File1003 | 2007/6/21 10:58:06 | 0:10:20 |
| File1004 | 2007/6/21 11:15:57 | 0:06:04 |
| File1005 | 2007/6/21 11:35:03 | 0:03:01 |
| File1006 | 2007/6/21 11:53:24 | 0:05:01 |
| File1007 | 2007/6/23 16:12:50 | 0:09:28 |
| File1008 | 2007/6/23 16:27:27 | 0:06:01 |
| File1009 | 2007/6/23 16:43:11 | 0:06:54 |
| File1010 | 2007/6/23 20:42:24 | 0:04:14 |
| File1011 | 2007/6/23 21:01:31 | 0:03:41 |
| File1012 | 2007/6/23 21:19:02 | 0:05:47 |
| File1013 | 2007/6/23 21:34:53 | 0:07:51 |
| File1014 | 2007/6/24 9:05:05 | 0:03:50 |
| File1015 | 2007/6/24 9:20:49 | 0:11:39 |

FIG. 4

FILE NAME

| | A | B | C | D | E | F | G | H | I | J | K | L | M | N | O | P |
|---|---|---|---|---|---|---|---|---|---|---|---|---|---|---|---|---|
| 1 | 1 ||||||||||||||||
| 2 | 1 |||||||| 2 ||||||||
| 3 | 1 ||||| 2 |||| 3 |||||||
| 4 | 1 ||||| 2 |||| 3 |||| 4 |||
| 5 | 1 ||||| 2 ||| 3 || 4 || 5 |||
| 6 | 1 |||| 2 ||| 3 | 4 || 5 || 6 |||
| 7 | 1 || 2 || 3 ||| 4 | 5 || 6 || 7 |||
| 8 | 1 || 2 | 3 | 4 ||| 5 | 6 || 7 || 8 |||
| 9 | 1 || 2 | 3 | 4 ||| 5 | 6 | 7 | 8 ||| 9 ||
| 10 | 1 || 2 | 3 | 4 ||| 5 | 6 | 7 | 8 || 9 | 10 |
| 11 | 1 || 2 | 3 | 4 ||| 5 | 6 | 7 | 8 | 9 | 10 | 11 |
| 12 | 1 || 2 | 3 | 4 || 5 | 6 | 7 | 8 | 9 | 10 | 11 | 12 |
| 13 | 1 | 2 | 3 | 4 | 5 || 6 | 7 | 8 | 9 | 10 | 11 | 12 | 13 |
| 14 | 1 | 2 | 3 | 4 | 5 | 6 || 7 | 8 | 9 | 10 | 11 | 12 | 13 | 14 |
| 15 | 1 | 2 | 3 | 4 | 5 | 6 | 7 | 8 | 9 | 10 | 11 | 12 | 13 | 14 | 15 |
| 16 | 1 | 2 | 3 | 4 | 5 | 6 | 7 | 8 | 9 | 10 | 11 | 12 | 13 | 14 | 15 | 16 |

GROUPING STEP

FIG. 5

FILE NAME

| Grouping Step | A | B | C | D | E | F | G | H | I | J | K | L | M | N | O | P |
|---|---|---|---|---|---|---|---|---|---|---|---|---|---|---|---|---|
| 1 | 1 | 2 | 3 | 4 | 5 | 6 | 7 | 8 | 9 | 10 | 11 | 12 | 13 | 14 | 15 | 16 |
| 2 | 1 | 2 | 3 | 4 | 5 | 6 | 6 | 7 | 8 | 9 | 10 | 11 | 12 | 13 | 14 | 15 |
| 3 | 1 | 2 | 3 | 4 | 5 | 6 | 6 | 7 | 8 | 9 | 10 | 11 | 12 | 13 | 13 | 14 |
| 4 | 1 | 2 | 2 | 3 | 4 | 5 | 5 | 6 | 7 | 8 | 9 | 10 | 11 | 12 | 12 | 13 |
| 5 | 1 | 1 | 2 | 3 | 4 | 5 | 5 | 6 | 7 | 8 | 9 | 10 | 10 | 11 | 11 | 12 |
| 6 | 1 | 1 | 2 | 3 | 4 | 4 | 4 | 5 | 6 | 7 | 8 | 9 | 9 | 10 | 10 | 11 |
| 7 | 1 | 1 | 2 | 3 | 4 | 4 | 4 | 5 | 6 | 7 | 7 | 8 | 8 | 9 | 9 | 10 |
| 8 | 1 | 1 | 2 | 3 | 4 | 4 | 4 | 5 | 6 | 7 | 7 | 8 | 8 | 9 | 9 | 9 |
| 9 | 1 | 1 | 2 | 3 | 4 | 4 | 4 | 5 | 5 | 6 | 6 | 7 | 7 | 8 | 8 | 8 |
| 10 | 1 | 1 | 2 | 2 | 3 | 3 | 3 | 4 | 4 | 5 | 5 | 6 | 6 | 7 | 7 | 7 |
| 11 | 1 | 1 | 1 | 1 | 2 | 2 | 2 | 3 | 4 | 4 | 5 | 5 | 6 | 6 | 6 | 6 |
| 12 | 1 | 1 | 1 | 1 | 2 | 2 | 2 | 2 | 3 | 3 | 4 | 4 | 5 | 5 | 5 | 5 |
| 13 | 1 | 1 | 1 | 1 | 2 | 2 | 2 | 2 | 3 | 3 | 3 | 3 | 4 | 4 | 4 | 4 |
| 14 | 1 | 1 | 1 | 1 | 2 | 2 | 2 | 2 | 3 | 3 | 3 | 3 | 3 | 3 | 3 | 3 |
| 15 | 1 | 1 | 1 | 1 | 1 | 1 | 1 | 1 | 2 | 2 | 2 | 2 | 2 | 2 | 2 | 2 |
| 16 | 1 | 1 | 1 | 1 | 1 | 1 | 1 | 1 | 1 | 1 | 1 | 1 | 1 | 1 | 1 | 1 |

Examples:
- A grouping step that is the largest in the number of evaluation items whose scores exceed a threshold value is determined as an optimum grouping step.
- A grouping step that is the largest in the total score of evaluation items is determined as an optimum grouping step.

Examples:
- A grouping step that is the largest in the number of evaluation-item curvatures exceeding a threshold value is determined as an optimum grouping step.
- A grouping step that is the largest in the total curvature of evaluation items is determined as an optimum grouping step.

Example:
• A grouping step that is the largest in the number of point-added evaluation-item curvatures exceeding a threshold value is determined as an optimum grouping step.
• A grouping step that is the largest in the total of point-added evaluation-item curvatures is determined as an optimum grouping step.

APPARATUS FOR AND METHOD OF PROCESSING IMAGE INFORMATION TO GROUP IMAGE DATA PIECES BASED ON SHOOTING INTERVALS

BACKGROUND OF THE INVENTION

1. Field of the Invention

The present invention relates to a technique of grouping images according to information related to the images, and particularly, to an image information processing apparatus and an image information processing method that group images by evaluating variations in temporal intervals in each group of images. The present invention also relates to a computer readable medium that stores a program for processing images.

2. Description of Related Art

A variety of techniques have been proposed in recent years for automatically grouping still images taken with digital still cameras or videos shot with digital video cameras. For example, Japanese Unexamined Patent Application Publication No. 2007-94762 discloses a technique of dividing images into groups at each part where a temporal interval variation is larger than a threshold value, so that the image groups thus formed may match user's feeling of image grouping.

This related art groups images according to only the shooting time of each image and never considers unity in each group or variations in the numbers of images among groups. In addition, the related art evaluates interval variations among images when grouping the images, and therefore, resultant image groups are greatly influenced by conditions under which the images have been taken. As a result, each image group formed according to the related art has a possibility of showing no unity. There is, therefore, a necessity of a new grouping technique that evaluates shooting interval variations in each group of images and considers unity in each group and variations in the numbers of images among groups.

SUMMARY OF THE INVENTION

An object of the present invention is to provide an image information processing apparatus and an image information processing method that employ a novel image grouping technique not affected by image taking conditions and a computer readable medium that stores a program for making a computer achieve the novel image grouping technique.

In order to accomplish the objects, a first aspect of the present invention provides an apparatus for processing image information regarding image data pieces each having retrievable information including shooting time and a shooting interval. The apparatus includes a grouping unit configured to group the image data pieces, which are arranged in order of the shooting time, by sequentially carrying out grouping steps that each divide or merge the image data pieces into groups according to the shooting intervals, an evaluation unit configured to calculate a score for each of the grouping steps according to one or a plurality of predetermined evaluation items, and a determination unit configured to determine a specific one of the grouping steps according to the calculated scores.

The first aspect evaluates shooting interval variations group by group in each grouping step, to form groups of images without affected by image taking conditions.

According to a second aspect of the present invention, the determination unit determines a specific one of the grouping steps according to gradient variations representative of the grouping steps on a function that is based on the calculated scores.

According to a third aspect of the present invention, the determination unit determines a specific one of the grouping steps according to curvatures representative of the grouping steps on a curve that is defined by the calculated scores.

According to a fourth aspect of the present invention, the determination unit determines a specific one of the grouping steps from among those whose calculated scores take minimal values.

A fifth aspect of the present invention provides an apparatus for processing image information regarding image data pieces each having retrievable information including shooting time and a shooting interval. The apparatus includes a grouping unit configured to group the image data pieces, which are arranged in order of the shooting time, by sequentially carrying out grouping steps that each divide or merge the image data pieces into groups according to the shooting intervals, a first evaluation unit configured to calculate a first score for each of the grouping steps according to one or a plurality of predetermined first evaluation items, a second evaluation unit configured to calculate a second score for each of the grouping steps according to one or a plurality of predetermined second evaluation items, and a determination unit configured to find curvatures representative of the grouping steps on a curve that is defined by the first scores, find grouping steps corresponding to minimal values of the second scores, and determine a specific one of the grouping steps according to the curvatures and the minimal-value-corresponding grouping steps.

According to a sixth aspect of the present invention, the apparatus further includes a display control unit configured to display selectable indexes that correspond to groups of the image data pieces, respectively, the groups being formed in the determined specific grouping step. If one of the indexes is selected, the display control unit displays images representative of the image data pieces contained in the group corresponding to the selected index.

The display control unit may display the number of image data pieces contained in each group, together with the index corresponding to the image data pieces in the group. The display control unit may display a thumbnail image obtained from image data pieces contained in each group, as the index corresponding to the image data pieces contained in the group. The display control unit may display textual information obtained from image data pieces contained in each group, as the index corresponding to the image data pieces contained in the group, the textual information including the file name, shooting start time, shooting duration, shooting location name, and the like related to the image data pieces in the group. The determination unit may preset an upper limit for the number of image data pieces in each group and again determine a specific one of the grouping steps so that the number of image data pieces in each group formed in the specific grouping step may not exceed the upper limit. The display control unit may send a maximum number of indexes displayable in a display screen to the determination unit, and the determination unit may again determine a specific one of the grouping steps so that groups formed in the specific grouping step may keep the maximum number of indexes. The matters mentioned in this paragraph are also applicable to the below-mentioned aspects of the present invention.

A seventh aspect of the present invention provides a method of processing image information in an apparatus for processing image information regarding image data pieces each having retrievable information including shooting time and a shooting interval. The method includes grouping the image data pieces, which are arranged in order of the shooting time, by sequentially carrying out grouping steps that each divide or merge the image data pieces into groups according to the shooting intervals, calculating a score for each of the grouping steps according to one or a plurality of predetermined evaluation items, and determining a specific one of the grouping steps according to the calculated scores.

The seventh aspect evaluates shooting interval variations group by group in each grouping step, to form groups of images without affected by image taking conditions.

The nature, principle and utility of the invention will become more apparent from the following detailed description when read in conjunction with the accompanying drawings.

BRIEF DESCRIPTION OF THE DRAWINGS

In the accompanying drawings:

FIG. 3 is a view showing a table of shooting information extracted from images;

FIG. 4 is a view showing examples of grouping steps adoptable by the method of FIG. 2;

FIG. 5 is a view showing other examples of grouping steps adoptable by the method of FIG. 2;

DESCRIPTION OF THE PREFERRED EMBODIMENTS

<Embodiment 1>

Figure 1:
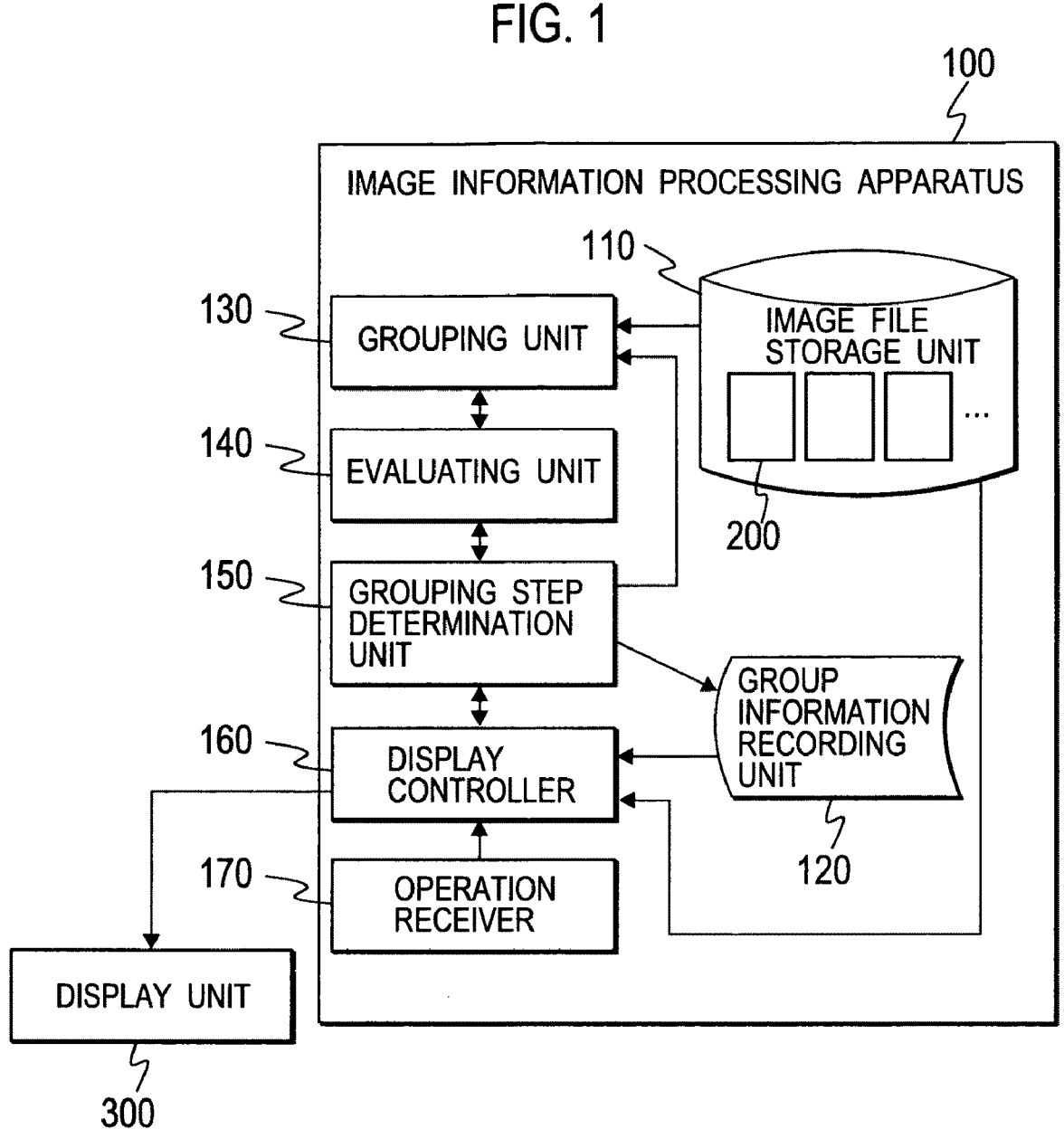
FIG. 1 is a block diagram showing an apparatus 100 for processing image information according to Embodiment 1 of the present invention.

Embodiment 1 of the present invention will be described in detail with reference to the drawings. FIG. 1 is a block diagram showing an apparatus 100 for processing image information according to Embodiment 1 of the present invention. The apparatus 100 includes an image file storage unit 110, a group information recording unit 120, a grouping unit 130, an evaluating unit 140, a grouping step determination unit 150, a display controller 160, and an operation receiver 170. The apparatus 100 is connected to a display unit 300.

The image file storage unit 110 is a nonvolatile storage unit such as a hard disk drive and a semiconductor storage device and stores image data pieces or image files 200 including video files shot with digital video cameras and still image files taken with digital still cameras. The storage unit 110 may be configured to be attachable to and detachable from the apparatus 100. Each image file 200 stored in the storage unit 110 has shooting information such as shooting start date/time and shooting duration. The shooting information conforms to image format standards such as JPEG and MPEG or management rules of the apparatus 100 and is recorded in a header or an index of the image file 200. The shooting information may be stored in a management information file. In this specification, the terms "video file" and "still image file" are not particularly distinguished one from another and are collectively treated as "image file." A shooting duration of a still image file is considered as, for example, zero seconds or five seconds and is evaluated according to techniques to be explained later. It is naturally possible to separately handle video files and still image files.

The group information recording unit 120 is a nonvolatile storage unit such as a hard disk drive and a semiconductor storage device and stores various information pieces to divide the image files 200 stored in the storage unit 110 into groups.

The grouping unit 130 divides the image files 200 stored in the storage unit 110 into groups by arranging the image files 200 in time series according to the shooting date/time of each image file and by sequentially carrying out grouping steps according to predetermined rules. The evaluating unit 140 employs predetermined evaluation items to calculate a score for each of the grouping steps. The grouping step determination unit 150 refers to the calculated scores and predetermined rules and determines a specific (optimum, final) grouping step from among the grouping steps. The details of the evaluation and grouping step determination carried out with these functional units will be explained later.

The display controller 160 displays, on the display unit 300 connected to the apparatus 100, an operation menu for the user, images reproduced from the storage unit 110, or representative images of the groups formed in the determined grouping step. The operation receiver 170 receives an operation conducted by the user with the use of an operation button, a menu, or the like. The display unit 300 may be installed on the apparatus 100.

The image information processing apparatus 100 may be applied to digital video cameras, digital still cameras, image file storage units, and the like that are capable of storing image files in internal or external media. The apparatus 100 may be made with the use of an electronic device such as a personal computer and a recorder capable of reading and storing image files.

Figure 2:
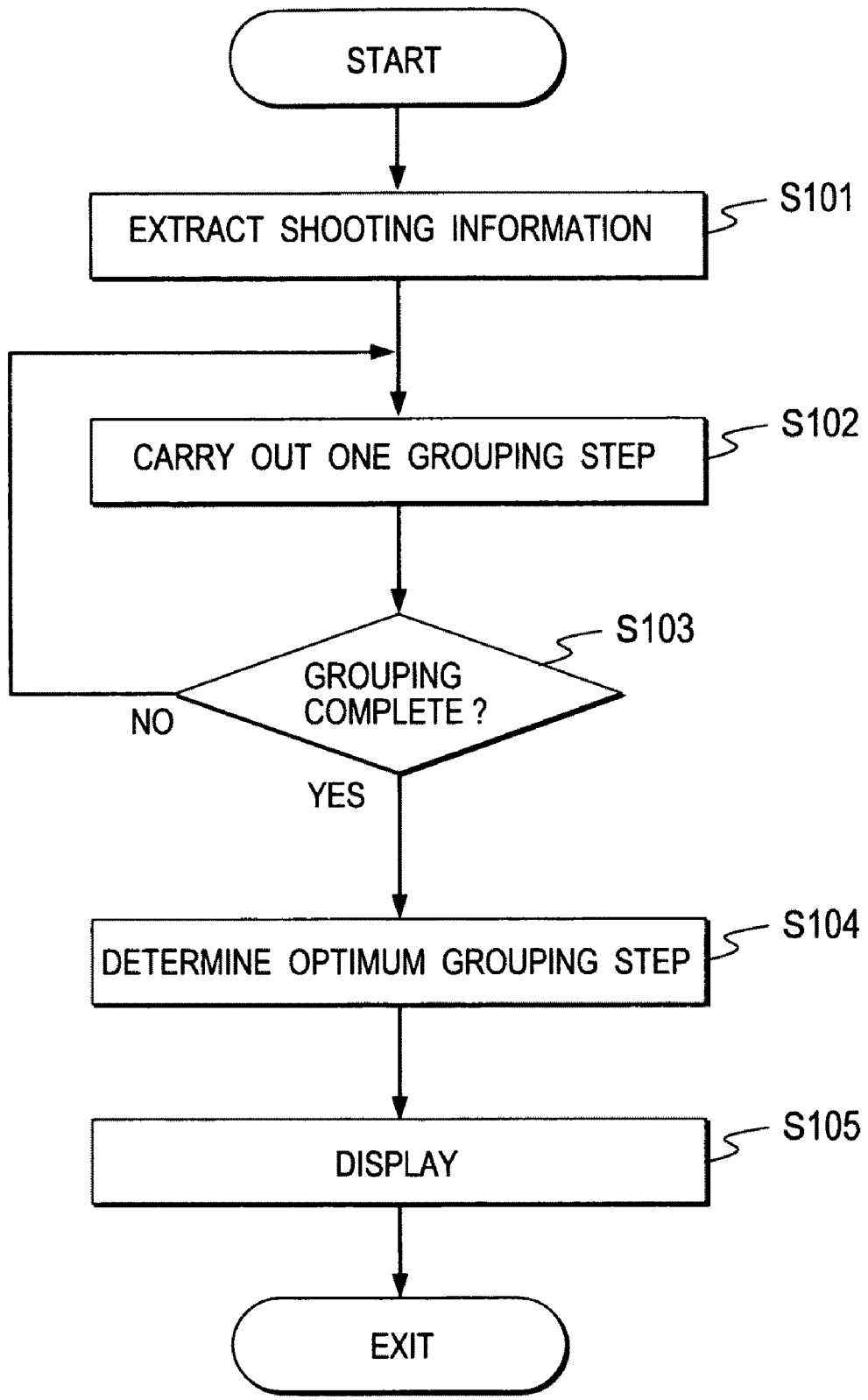
FIG. 2 is a flowchart generally showing a method of processing image information carried out in the apparatus of FIG. 1.

A method of processing image information according to an embodiment of the present invention will be explained. The method is carried out in the apparatus 100 of FIG. 1, to process image information and divide image files into groups. FIG. 2 is a flowchart generally showing a grouping process according to the method carried out in the apparatus 100.

The grouping process groups all image files 200 stored in the storage unit 110 into one group at first, and in each grouping step, divides one group into two according to predetermined rules until every image file is separated into a group. Namely, the number of grouping steps is equal to the number of image files.

The grouping process evaluates each grouping step, and according to evaluation results, determines a specific grouping step. Groups formed in the specific grouping step are considered to be optimum for the image files 200.

Before starting the grouping process, the user may attach categorization information to each image file 200. For example, the user may attach event information (leisure, field day, sports, children, pets, wedding, party, and the like) to each image file so that image files may be grouped according to the attached event information.

In step S101 of FIG. 2, the grouping unit 130 extracts shooting information from each image file 200 stored in the storage unit 110. FIG. 3 shows an example of a table of extracted shooting information. It is not always necessary to put the extracted shooting information in a table.

The table 121 of FIG. 3 has a file name 121*a*, a shooting start date/time 121*b*, and a shooting duration 121*c* for every image file 200. In the table 121, the image files 200 are sorted in order of the shooting start data-time 121*b*. In addition to the shooting start data-time 121*b* and shooting duration 121*c*, a shooting end date/time of each image file may be calculated and recorded. The shooting end date/time is useful to find shooting intervals (explained later) among the image files 200. Further, the categorization information attached by the user to each image file may also be recorded.

According to the table 121, step S102 carries out grouping steps one after another. The grouping process of step S102 is repeated in step S103 until all of the image files 200 are divided into different groups, respectively. As mentioned above, the image files 200 are entirely put in one group at first. Among the image files contained in the same group, a longest shooting interval is found, and at the position of the longest shooting interval, the image files of the group are divided into two groups. Namely, each grouping step increases the number of groups by one. A shooting interval between adjacent first and second image files is a period between the shooting start data-time 121*b* plus shooting duration 121*c* of the first image file (i.e., the shooting end date/time of the first image file) and the shooting start data-time 121*b* of the second image file.

FIG. 4 shows examples of grouping steps. In this example, there are 16 image files A to P as the image files 200 stored in the storage unit 110. The grouping step 1 puts the files A to P entirely in a group 1. Here, it is assumed that a longest shooting interval is present between the files I and J.

The grouping step 2 divides the group 1 between the files I and J into two groups, i.e., a group 1 of the files A to I and a group 2 of the files J to P. If a longest shooting interval exists between the files E and F of the group 1, the grouping step 3 divides the group 1 between the files E and F into two groups, to make the total number of groups three.

In this way, each grouping step finds a longest shooting interval and divides the group having the longest shooting interval at the position of the longest shooting interval into two. By sequentially carrying out the grouping steps, the 16 image files A to P are finally divided into 16 groups in the grouping step 16.

This example puts all image files in one group at first and divides the group step by step. Another example shown in FIG. 5 is also possible. This example divides all image files into different groups at first, finds a shortest shooting interval among the groups, and merges two groups involving the shortest shooting interval into one. By repeating this, the example of FIG. 5 finally makes a single group containing all image files. At this time, a cluster analysis technique may be employed. It is possible to separate image files involving extremely large shooting intervals in advance and process them separately.

Although this example employs shooting intervals as reference values to group image files, it is possible to employ other reference values to group image files. For example, an evaluation item (to be explained later) used to determine a specific grouping step may be employed to divide image files into groups at a location where a maximum or minimum score regarding the evaluation item is present.

Returning to FIG. 2, if step S103 provides "Yes" to indicate that the grouping process has been completed, step S104 determines a specific (optimum, final) one of the grouping steps. More precisely, the evaluation unit 140 evaluates each grouping step according to predetermined evaluation items, and according to evaluation results, the grouping step determination unit 150 determines an optimum grouping step among the grouping steps. Groups formed in the optimum grouping step are determined as final groups.

For example, it is assumed that the grouping step determination unit 150 determines that the grouping step 6 of FIG. 4 is optimum among the 16 grouping steps that have each been evaluated by the evaluation unit 140 according to predetermined evaluation items. Then, groups formed in the grouping step 6, i.e., a group 1 of files A to E, a group 2 of files F to H, a group 3 of file I, a group 4 of files J and K, a group 5 of files L and M, and a group 6 of files N to P are determined as final groups for the image files A to P. The resultant grouping is stored in the group information recording unit 120, or in the image files themselves. At this time, the resultant grouping may be stored in each of the image files 200 or in the image files that are at borders of the groups.

Once the final groups are determined, the display controller 160 displays in step S105 indexes such as thumbnail images representing the groups and prompts the user to select one of the indexes. The index of each group is not limited to a thumbnail image. For example, the index of a group may be textual information including a file name, shooting time, and the like related to the group.

Each group displayed with an index contains image files that have been determined to be relevant to one another. Guided by the indexes, the user can easily select a group in which an objective image file is contained.

The index of a group may be a thumbnail image of a first image file (still image or video) in the group, or may be set by the user, or may be determined according to any other rules. For example, the index of a group may be prepared from an image file contained in the group that has the longest shooting duration or the latest shooting date/time.

Once the user selects one of the indexes of the groups, the display controller 160 displays thumbnail images of the image files contained in the selected group and prompts the user to select one of them. Once the user selects one of the thumbnail images, the display controller 160 reproduces the image file corresponding to the selected thumbnail image. When one of the indexes of the groups is selected, it is possible to sequentially reproduce the image files contained in the selected group. This allows the user to view the image files 200 group by group.

Various patterns of the grouping step determination carried out in step S104 of FIG. 2 will be explained.

{Pattern 1}

Figure 6:
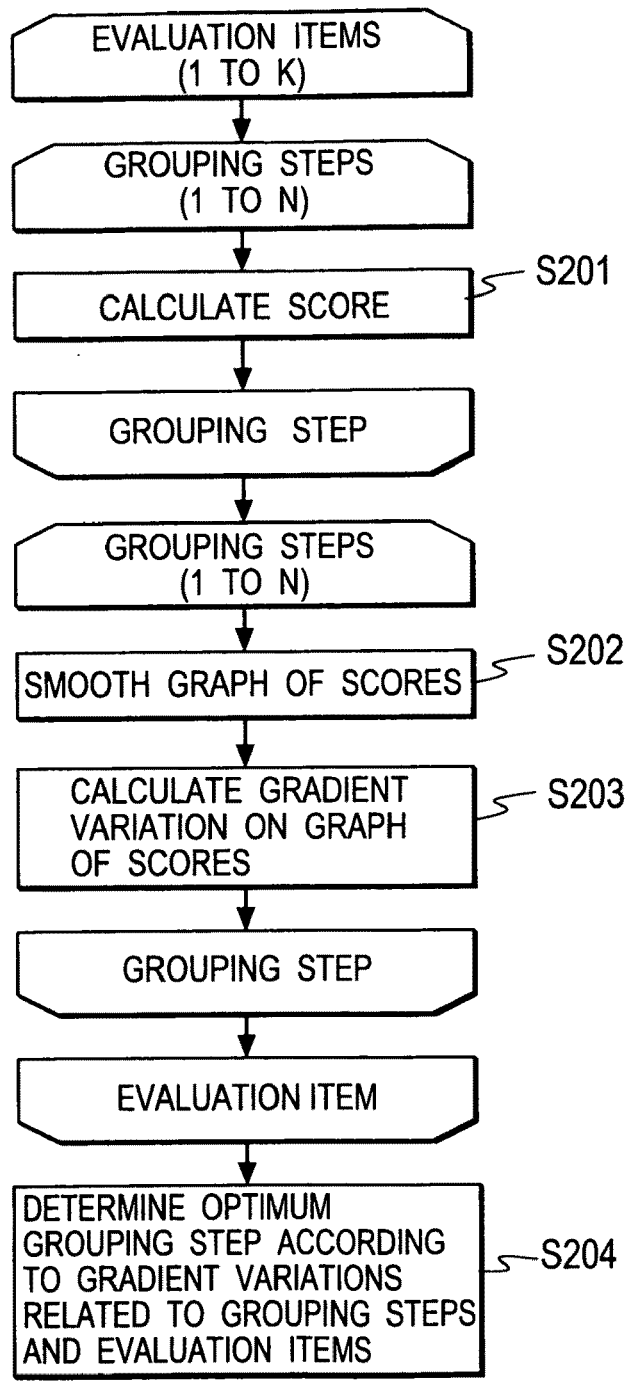
FIG. 6 is a flowchart showing a pattern 1 of grouping step determination adoptable by the method of FIG. 2.

FIG. 6 is a flowchart showing pattern 1 of the grouping step determination carried out in step S104 of FIG. 2.

The pattern 1 predetermines one or a plurality (1 to K) of evaluation items and calculates in step S201 a score for each of the grouping steps (1 to N).

Examples of evaluation items employed by the pattern 1 will be explained.

[1-1 Group Shooting Duration]

For each grouping step, this evaluation item sums up the shooting durations of image files group by group to find group shooting durations, calculates an average of the group shooting durations and a variance of the group shooting durations, and uses the average and variance as a score for the grouping step. Each group shooting duration becomes shorter as the number of groups increases. When the grouping process proceeds to some extent, there will be no group whose group shooting duration is extremely longer than the others. At the same time, the shooting duration average becomes smaller. If the group shooting durations are more or less equalized among the groups, the shooting duration variance will be small. The evaluation item 1-1 "Group shooting duration" is effective to group image files that have similar shooting durations.

In the example of FIG. 4, a score for the grouping step 2 based on the evaluation item 1-1 is calculated by summing up the shooting durations of the files A to I to find a group shooting duration of the group 1, summing up the shooting durations of the files J to P to find a group shooting duration of the group 2, and calculating an average and a variance of the group shooting durations of the groups 1 and 2.

[1-2 Group Idle Time]

For each grouping step, this evaluation item finds a difference between the shooting start time of a first image file and the shooting end time of a last image file in each group to find a group length of the group, sums up the shooting durations of image files in each group to find a group shooting duration of the group, subtracts the group shooting duration from the group length to find an idle time of each group, calculates an average and a variance of the idle time total of the groups, and uses the average and variance as a score for the grouping step. As the grouping process progresses, the idle time average becomes smaller. As the grouping process progresses, there will be no group that has an extremely long idle time, and therefore, the idle time variance becomes smaller.

In the example of FIG. 4, a score for the grouping step 2 based on the evaluation item 1-2 is calculated by finding a difference between the shooting start time of the file A and the shooting end time of the file I to find a group length of the group 1, summing up the shooting durations of the files A to I to find a group shooting duration of the group 1, subtracting the group shooting duration from the group length to find an idle time of the group 1, finding a difference between the shooting start time of the file J and the shooting end time of the file P to find a group length of the group 2, summing up the shooting durations of the files J to P to find a group shooting duration of the group 2, subtracting the group shooting duration from the group length to find an idle time of the group 2, and calculating an average and a variance of the idle time total of the groups 1 and 2.

[1-3 Shooting Interval]

For each grouping step, this evaluation item finds a shooting interval between adjacent image files where the grouping step has just divided a group into two and uses the shooting interval as a score for the grouping step. As the grouping process progresses, a shooting interval where a group is divided into two becomes shorter, and in each group, shooting intervals among image files are nearly equalized.

In the example of FIG. 4, a score for the grouping step 2 based on the evaluation item 1-3 is obtained from a shooting interval between the image files I and J.

[1-4 Shooting Interval Just Used For Grouping/Average of Shooting Intervals Used for Grouping]

For each grouping step, this evaluation item finds a shooting interval between adjacent image files where the grouping step has just divided a group into two, calculates an average of shooting intervals already used for grouping, divides the found shooting interval by the shooting interval average, and uses the quotient as a score for the grouping step. As the grouping process progresses, a shooting interval where a group is divided into two becomes shorter. This evaluation item checks if a shooting interval just used for grouping is long relative to shooting intervals already used for grouping.

In the example of FIG. 4, a score for the grouping step 4 based on the evaluation item 1-4 is calculated by dividing a shooting interval between the files M and N by an average of a shooting interval between the files I and J and a shooting interval between the files E and F.

[1-5 Shooting Interval Unused For Grouping/Average of Shooting Intervals Used For Grouping]

For each grouping step, this evaluation item finds a shooting interval between adjacent images not used for grouping, calculates an average of shooting intervals already used for grouping, divides the found shooing interval by the shooting interval average, and uses the quotient as a score for the grouping step. As the grouping process progresses, a shooting interval between image files where a group is divided into two becomes shorter. This evaluation item checks if a shooting interval unused for grouping is long relative to shooting intervals already used for grouping.

In the example of FIG. 4, a score for the grouping step 15 based on the evaluation item 1-5 is calculated by finding a shooting interval between each of the adjacent file pairs of A-B, B-C, C-D, D-E, E-F, G-H, H-I, I-J, J-K, K-L, L-M, M-N, N-O, and O-P, calculating an average of these shooting intervals, and dividing a shooting interval between the files F and G by the average.

[1-6 Average of Shooting Intervals Unused For Grouping]

For each grouping step, this evaluation item calculates an average of shooting intervals among files not yet used for grouping and uses the average as a score for the grouping step. This score becomes smaller as the grouping process progresses.

In the example of FIG. 4, a score for the grouping step 14 based on the evaluation step 1-6 is calculated by finding a shooting interval between each of the adjacent file pairs of F-G and N-O and calculating an average of these shooting intervals.

[1-7 Variance of Shooting Intervals Unused For Grouping]

For each grouping step, this evaluation item calculates a variance of shooting intervals among files not yet used for grouping and uses the variance as a score for the grouping step. This score becomes smaller as the grouping process progresses.

In the example of FIG. 4, a score for the grouping step 14 based on the evaluation item 1-7 is calculated by finding a shooting interval between each of the adjacent file pairs of F-G and N-O and calculating a variance of these shooting intervals.

[1-8 Variance of Group File Count]

For each grouping step, this evaluation item finds a file count in each group, calculates a variance of the group file counts, and uses the variance as a score for the grouping step. This is effective to nearly equalizes file counts among groups.

In the example of FIG. 4, a score for the grouping step 3 based on the evaluation item 1-8 is calculated by finding the number of image files in each of the groups 1, 2, and 3 and calculating a variance of these file counts.

[1-9 Sum of File Distances From Group Barycenter]

For each grouping step, this evaluation item finds barycentric time (central shooting time) in each group and calculates, for every image file, a difference between central shooting time of the image file and the barycentric time of the group to which the image file belongs. The differences of all files are summed up and the sum is used as a score for the grouping step. If any one group contains an image file whose central shooting time is extremely distant from the barycentric time of the group, the score will be large. If the score is small, it is considered that the groups are more or less converged.

[1-10 Sum of Weighted File Distances From Group Barycenter]

For each grouping step, this evaluation item finds barycentric time in each group and calculates, for every image file, a difference between central shooting time of the image file and the barycentric time of the group to which the image file belongs. The calculated difference of each image file is multiplied by a shooting duration related to the image file. The products of the multiplications are summed up and the sum is used as a score for the grouping step. If any one group contains an image file whose central shooting time is extremely distant from the barycentric time of the group, the score will be large. If the score is small, it is considered that the groups are more or less converged. Such an extremely distant image file may form a separate group.

[1-11 Shooting Interval Just Used For Grouping/Average of Shooting Interval Unused For Grouping]

For each grouping step, this evaluation item finds a shooting interval between adjacent image files where the grouping step has just divided a group into two, calculates an average of shooting intervals not yet used for grouping, divides the found shooting interval by the shooting interval average, and uses the quotient as a score for the grouping step. As the grouping process progresses, a shooting interval where a group is divided into two becomes shorter. This evaluation item checks if a shooting interval just used for grouping is short relative to shooting intervals not yet used for grouping.

The pattern 1 uses one or a plurality of these evaluation items 1-1 to 1-11 to calculate a score for every grouping step. Which of the evaluation items are used must be determined in advance. Not only the above-mentioned evaluation items but also other evaluation items are employable.

Scores provided by the evaluation items of the pattern 1 tend to decrease as the grouping process progresses. A relationship between the scores and the grouping steps generally shows a curve of FIG. 7.

Figure 7:
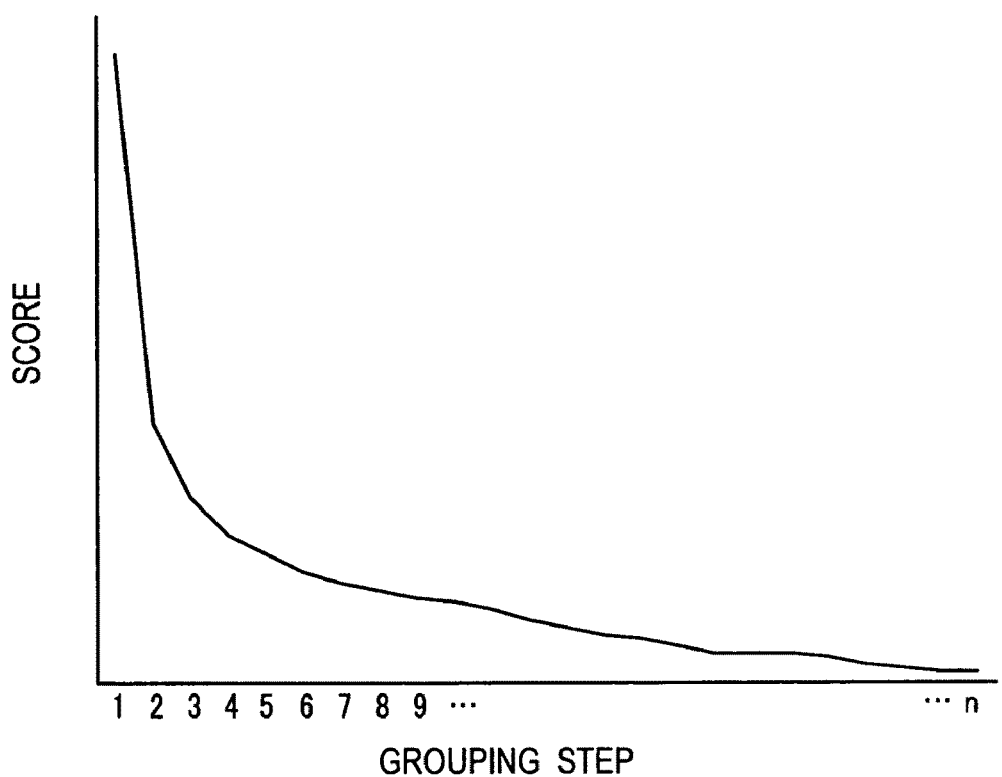
FIG. 7 is a graph showing a relationship between scores and grouping steps based on the pattern 1 of FIG. 6.

To see a general tendency, step S202 of FIG. 6 smoothes the curve of FIG. 7 with the use of window functions, moving averages, and the like. The smoothing, however, is not always needed.

The pattern 1 selects, as a candidate (optimum) grouping step, a grouping step that shows a large gradient variation on the score-grouping step curve. If the evaluation item 1-3 "Shooting interval" is employed, a shooting interval between image files where a group is divided into two is generally conspicuous among shooting intervals in the same group. This is the reason why a grouping step that shows a large gradient variation on the score-grouping step curve is selected as a candidate grouping step.

The gradient variation of each grouping step is calculated in step S203 of FIG. 6 according to, for example, the following expression:

$$P(C_i) = \left\{\frac{d(C_{i+1}) - d(C_i)}{k}\right\} - \left\{\frac{d(C_i) - d(C_{i-k})}{k}\right\} \quad (1)$$

where $d(C_i)$ is a score for a grouping step "i," $P(C_i)$ is a gradient variation obtained from a gradient between the score $d(C_i)$ and a scored $(C_i+k)$ for a grouping step "i+k" and a gradient between the score $d(C_i)$ and a score $d(C_i-k)$ for a grouping step "i-k," and k is, for example, 1, 3, 5, or the like.

Figure 8:
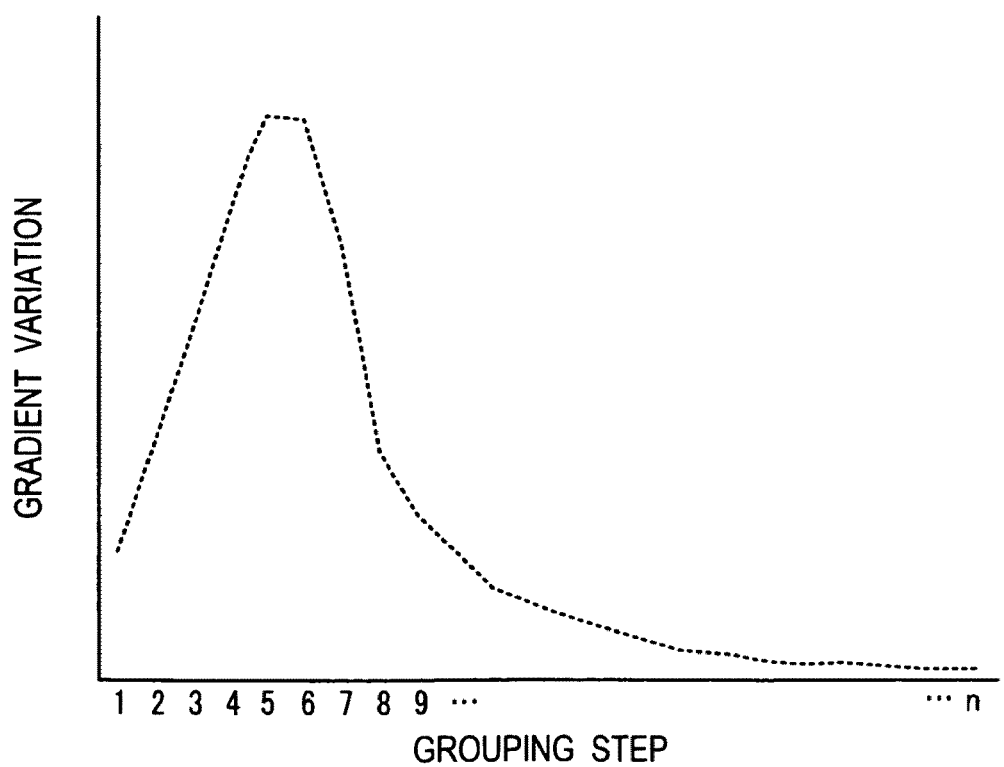
FIG. 8 is a graph showing a relationship between gradient variations and grouping steps based on the pattern 1 of FIG. 6.

FIG. 8 is a graph showing a relationship between the gradient variations and the grouping steps.

Scores provided by the evaluation items of the pattern 1 generally show a gradient variation-grouping step relationship like that shown in FIG. 8. There will be no gradient variation at the end of the graph. The graph of FIG. 8, however, has values at the end thereof for convenience. If only one evaluation item is adopted, a grouping step having a largest gradient variation is determined as a final (optimum) grouping step in step S204 of FIG. 6.

Figure 9:
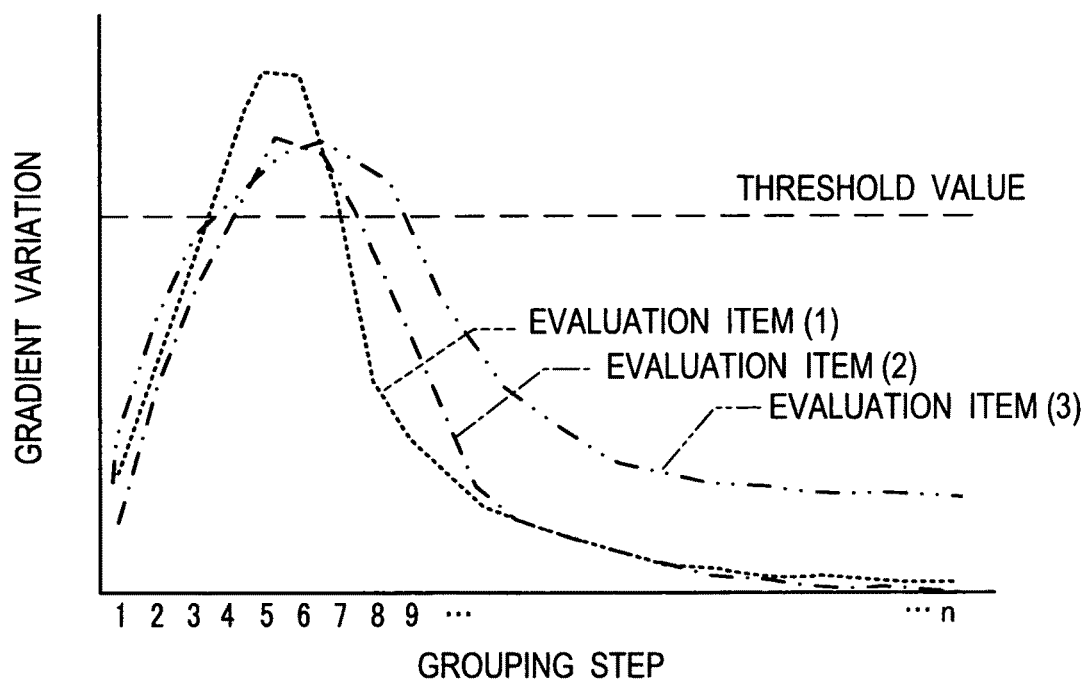
FIG. 9 is a graph showing relationships between gradient variations and grouping steps with different evaluation items based on the pattern 1 of FIG. 6.

If a plurality of evaluation items are adopted, a graph like that shown in FIG. 9 will be prepared. In FIG. 9, there are three evaluation items (1), (2), and (3) that each provide a score and gradient variation for each grouping step. When a plurality of evaluation items are employed, a threshold value may be set for gradient variations and a grouping step that involves a largest number of evaluation items exceeding the threshold value may be determined as a final grouping step in step S204 of FIG. 6. In this case, it is preferable to divide each gradient variation of each evaluation item by a maximum gradient variation of the corresponding evaluation item, to equalize the maximum values of the evaluation items.

Alternatively, the gradient variations of the evaluation items of each grouping step may be summed up and a grouping step having a maximum sum may be determined as a final grouping step. In this case, it is also preferable to equalize the maximum values of the evaluation items. It is possible to weight the evaluation items.

{2 Pattern 2-1}

Pattern 2 of the grouping step determination carried out in step S104 of FIG. 2 will be explained. The pattern 2 includes three patterns 2-1, 2-2, and 2-3. The pattern 2-1 will be explained with reference to a flowchart of FIG. 10. The pattern 2-1 uses one or a plurality (1 to k) of evaluation items and calculates, in step S301, a score of each evaluation item for each of the grouping steps (1 to N).

The pattern 2-1 may employ the same evaluation items as those of the pattern 1. The pattern 2-1 employs one or a plurality of the evaluation items and calculates a score for each grouping step. The evaluation items to be employed must be determined in advance.

The pattern 2-1 selects, as a candidate (optimum) grouping step, a grouping step that has a large curvature on a graph plotted from scores. If the pattern 2-1 employs the evaluation item 1-3 "Shooting interval," a shooting interval between adjacent image files where a group is divided into two is generally very long compared with shooting intervals among files to be put in the same group. Accordingly, a grouping step that shows a large curvature change on an approximated curve of scores is selected as an optimum grouping step. Instead of curvature, any other index such as gradient variation employed by the pattern 1 may be used.

Employing the same evaluation items as the pattern 1, the pattern 2-1 provides scores that tend to decrease as the grouping process progresses. Accordingly, a relationship between scores and the grouping steps is like a continuous curve shown in FIG. 11. Each score may be multiplied by an optional value. For example, each score may be multiplied by "total number of image files/maximum score."

To see a general tendency, step S302 of FIG. 10 approximates the continuous curve of FIG. 11 with a power curve expressed as follows:

$$y = ax^b \qquad (2)$$

Figure 11:
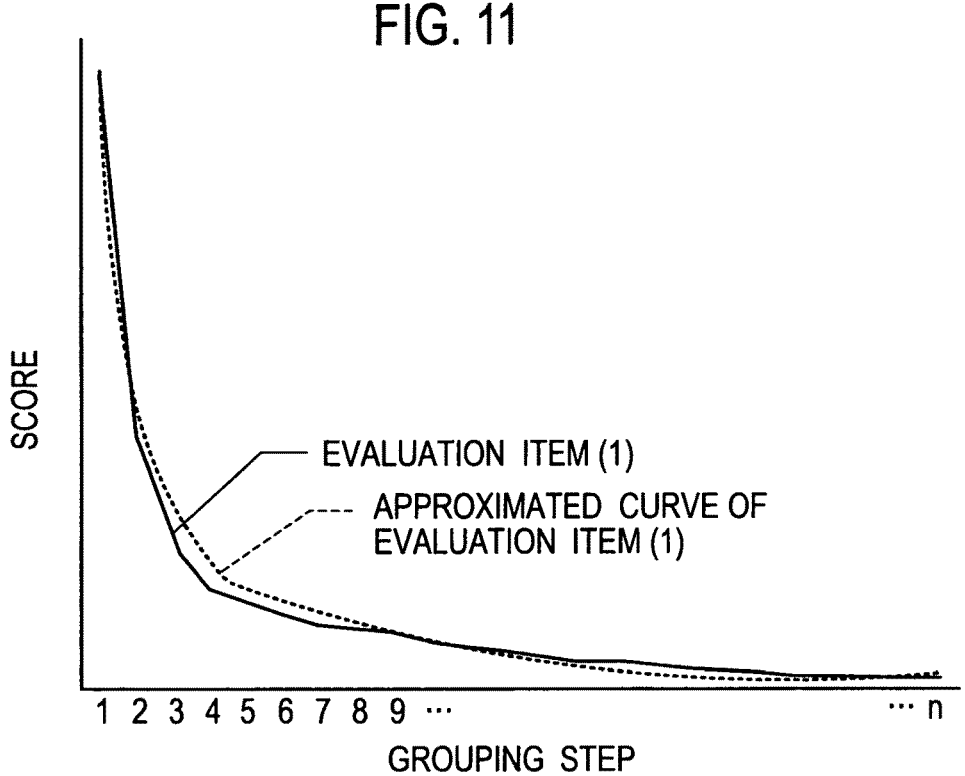
FIG. 11 is a graph showing relationships between scores and grouping steps based on the pattern 2-1 of FIG. 10.

The approximated curve is a dotted curve in FIG. 11. Coefficients of the approximation are calculable according to known techniques. Instead of the power curve, any other function is employable.

Figure 10:
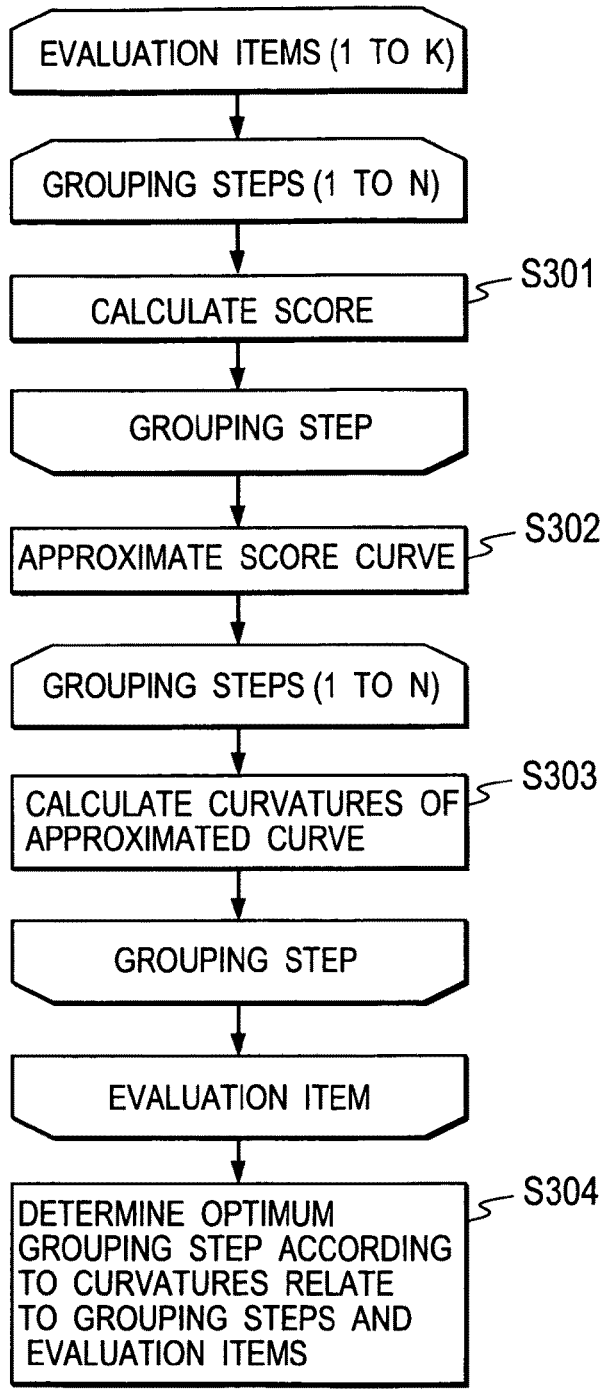
FIG. 10 is a flowchart showing a pattern 2-1 of grouping step determination adoptable by the method of FIG. 2.
Figure 12:
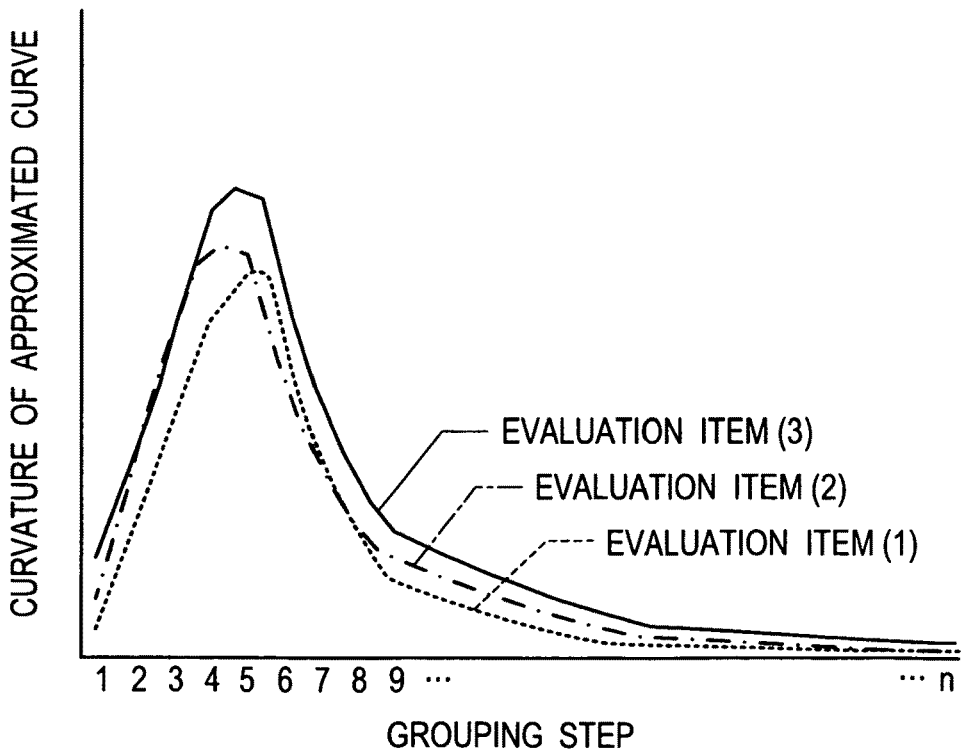
FIG. 12 is a graph showing relationships between curvatures of approximated curves and grouping steps with different evaluation items based on the pattern 2-1 of FIG. 10.

Step S303 of FIG. 10 calculates a curvature of each grouping step on the approximated curve. FIG. 12 is a graph showing a relationship between curvatures on approximated curves and the grouping steps. In FIG. 12, three evaluation items (1), (2), and (3) provide respective scores, and according to the scores, the three approximated curves are plotted. On each approximated curve, a curvature is calculated for every grouping step. When a plurality of evaluation items are employed, a threshold value may be set on curvatures of approximated curves and a grouping step that involves a largest number of evaluation items exceeding the threshold value may be determined as a final grouping step in step S304 of FIG. 10. In this case, it is preferable to divide each curvature of each approximated curve of each evaluation item by a maximum curvature of the evaluation item, to equalize the maximum curvatures of the approximated curves to 1. Each evaluation item may be weighted.

The curvatures on the approximated curves of the evaluation items of each grouping step may be summed up and a grouping step having the maximum sum may be determined as a final grouping step. In this case, it is possible to equalize the maximum values of the evaluation items, or weight the evaluation items. It is also possible to find, for each evaluation item, a grouping step having a largest curvature, find the number of groups contained in each of the largest-curvature grouping steps, and determine as an optimum grouping step a grouping step having an average of the numbers of groups among the largest-curvature grouping steps.

{3 Pattern 2-2}

Figure 13:
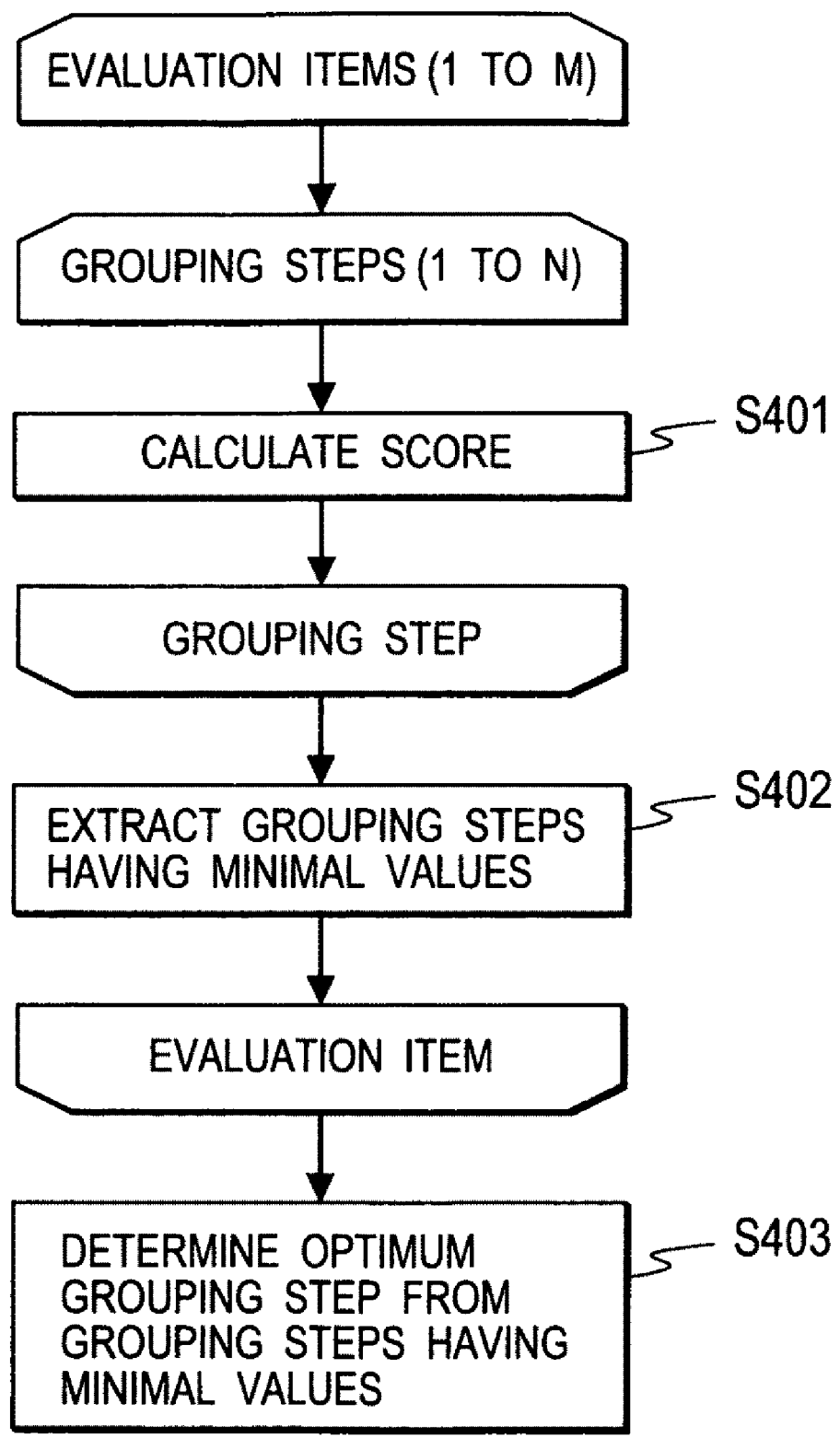
FIG. 13 is a flowchart showing a pattern 2-2 of grouping step determination adoptable by the method of FIG. 2.

The pattern 2-2 of the grouping step determination carried out in step S104 of FIG. 2 will be explained with reference to a flowchart of FIG. 13. The pattern 2-2 employs one or a plurality (1 to M) of evaluation items and calculates, in step S401, a score of each evaluation item for each of grouping steps (1 to N).

Examples of evaluation items employed by the pattern 2-2 will be explained.

[2-1 Variance of Shooting Durations]

For each grouping step, this evaluation item calculates a variance of the shooting durations of image files group by group, finds an average and a variance of the calculated variances, and uses the average and variance as a score for the grouping step. Optimally formed groups are each considered to contain image files of the same subject or similar subjects, and therefore, the shooting durations of image files in each of such groups are considered to be similar. In this case, an average of the shooting-duration variances of such groups is small. If a variance of the shooting-duration variances of groups is small, the shooting-duration variances of the groups are considered not to vary widely. This means that the shooting durations of image files are similar in each group.

In the example of FIG. 4, a score for the grouping step 2 based on the evaluation item 2-1 is calculated by calculating a variance of shooting durations of the image files A to I and a variance of the shooting durations of the image files J to P and finding an average and a variance of these variances.

[2-2 Variance of Shooting Intervals]

For each grouping step, this evaluation item calculates a variance of shooting intervals among files in each group, finds an average and a variance of the calculated variances, and uses the average and variance as a score for the grouping step. If shooting conditions are unchanged and if each group is optimally formed, each group will have similar shooting intervals among image files in the group. In this case, an average of shooting interval variances of the groups is small. If a variance of shooting interval variances of groups is small, the shooting interval variances of the groups are considered not to vary widely. This means that the shooting intervals among image files are similar in each group.

In the example of FIG. 4, a score for the grouping step 2 based on the evaluation item 2-2 is calculated by calculating a variance of shooting intervals among the image files A to I and a variance of shooting intervals among the image files J to P and finding an average and a variance of these variances.

The pattern 2-2 employs one or a plurality of the above-mentioned evaluation items, to calculate a score for every grouping step. The evaluation items to be employed must be determined in advance. The pattern 2-2 may employ not only the above-mentioned evaluation items but also other evaluation items.

Scores provided by the evaluation items concerning the pattern 2-2 become smaller as the shooting durations or shooting intervals of grouped image files become equalized. It is generally understood that shooting the same subject provides image files having similar shooting durations and similar shooting intervals. In this case, a variance related to the grouping step in question becomes smaller than those related to the adjacent grouping steps. Accordingly, the pattern 2-2 selects a grouping step having a minimal value as a candidate grouping step.

Figure 14:
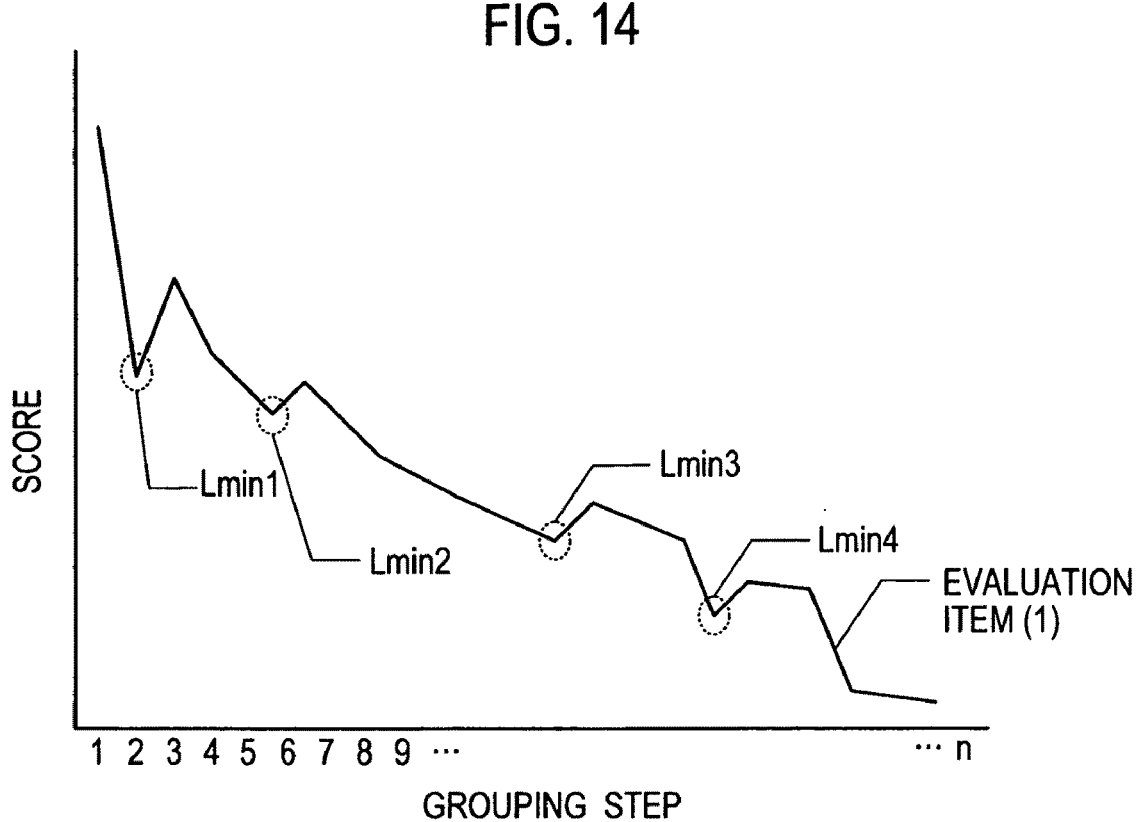
FIG. 14 is a graph showing a relationship between scores and grouping steps based on the pattern 2-2 of FIG. 13.

FIG. 14 is a graph showing a relationship between scores and the grouping steps. If only one evaluation item is employed, step S403 of FIG. 13 determines one of the grouping steps having minimal values Lmin1, Lmin2, Lmin3, and Lmin4 as a final grouping step. Which of the grouping steps of minimal values is selected is optional. It may be determined according to predetermined rules or user's settings. If there is a requirement to reduce the number of groups, the grouping step having the minimal value Lmin1 involving the smallest number of groups may be determined as a final grouping step.

Figure 15:
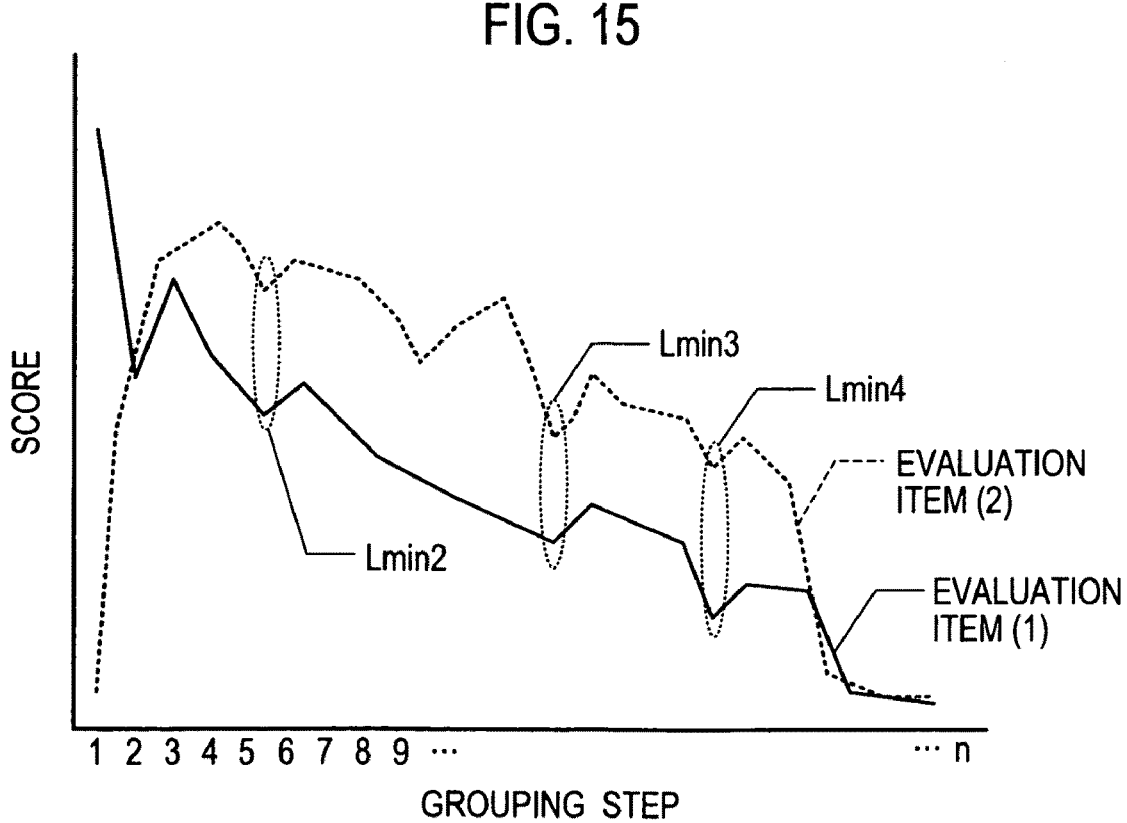
FIG. 15 is a graph showing relationships between scores and grouping steps with different evaluation items based on the pattern 2-2 of FIG. 13.

If a plurality of evaluation items are employed, a graph of FIG. 15 will be prepared. In this example, evaluation items (1) and (2) are employed to calculate a score for each grouping step. The evaluation items are preferably a combination of average and variance of the same matter, e.g., an average and a variance of variances of shooting durations of image files contained in groups, or an average and a variance of variances of shooting intervals among image files contained in groups.

In FIG. 15, the evaluation items (1) and (2) both show minimal values at Lmin2, Lmin3, and Lmin4. Accordingly, step S403 of FIG. 13 determines one of the grouping steps corresponding to the minimal values Lmin2, Lmin3, and Lmin4 as a final (optimum) grouping step. Which of the grouping steps having the minimal values is selected is optional. It may be determined according to predetermined rules or user's settings.

{4 Pattern 2-3}

Figure 16:
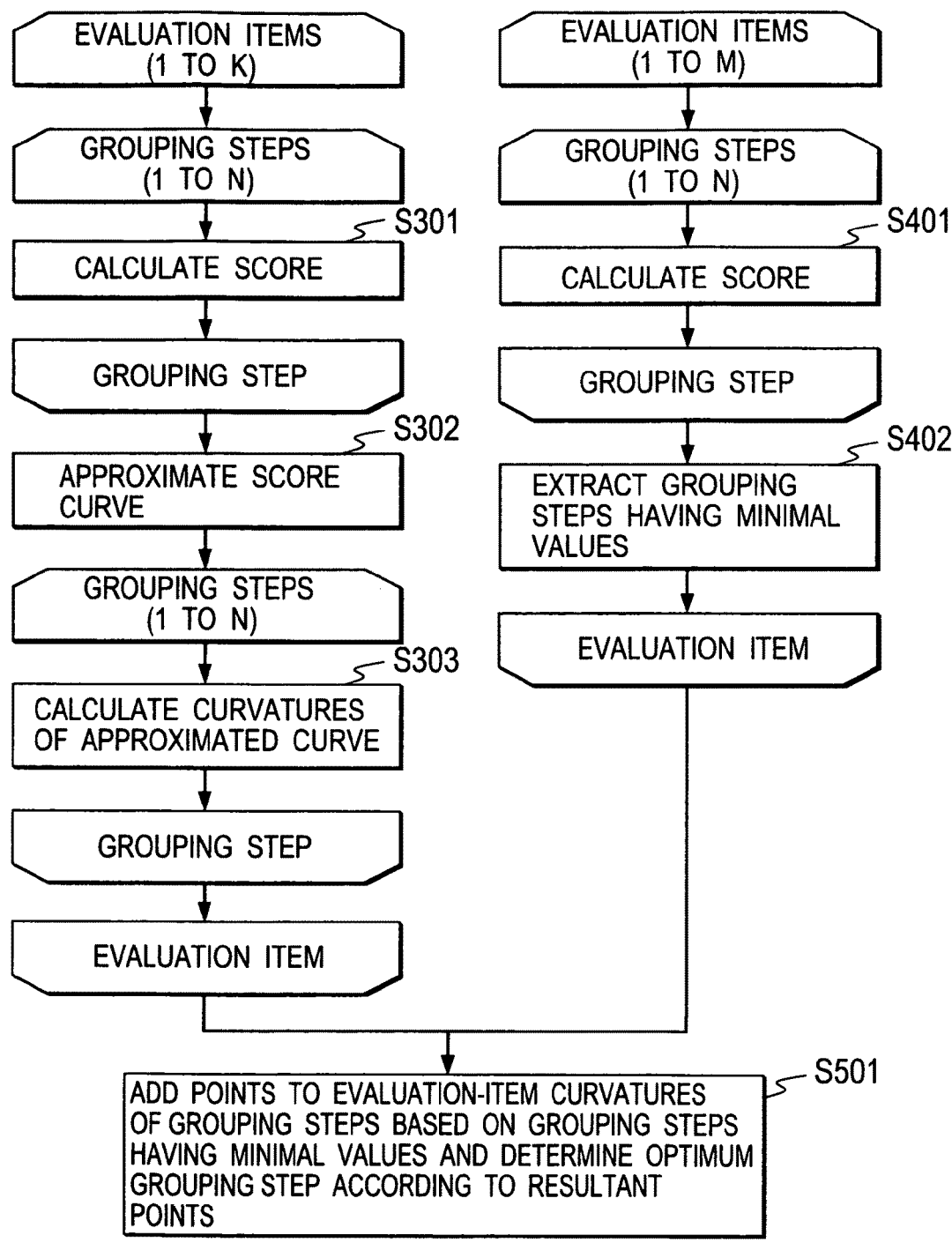
FIG. 16 is a flowchart showing a pattern 2-3 of grouping step determination adoptable by the method of FIG. 2.

The pattern 2-3 of the grouping step determination carried out in step S104 of FIG. 2 will be explained with reference to a flowchart of FIG. 16. The pattern 2-3 is a combination of the patterns 2-1 and 2-2. The pattern 2-1 is carried out through steps S301 to S303 and the pattern 2-2 through steps S401 to S402. Thereafter, results of the patterns 2-1 and 2-2 are combined to determine a final grouping step in step S501.

More precisely, the pattern 2-1 provides each grouping step with curvatures on approximated curves (FIG. 12) and the pattern 2-2 provides each grouping step with points (minimal values). The curvatures of the grouping steps corresponding to the minimal values are increased through some process and the resultant curvatures are evaluated according to the pattern 2-1, to determine a final grouping step. The curvature increasing process takes place by adding a value to a curvature or by multiplying a curvature by a coefficient.

For example, it is supposed that the pattern 2-2 provides the grouping steps 4, 7, and 11 with minimal values. In this case, curvatures provided by the pattern 2-1 for the grouping steps 4, 7, and 11 are multiplied by 1.5.

In another example, it is supposed that the pattern 2-2 provides several grouping steps with minimal values. Among them, the grouping step having the largest curvature provided by the pattern 2-1 is selected and predetermined values are added to the highest-curvature grouping step and several grouping steps around the highest-curvature grouping step. At this time, a largest value is added to a grouping step having a minimal value and lower values are added to other grouping steps depending on their distances from the minimum-value grouping step.

For example, it is supposed that the pattern 2-1 provides the grouping step 5 with a largest curvature and the pattern 2-2 provides the grouping steps 8 and 15 with minimal values. In this case, the grouping step 8 receives 10 points, the grouping steps 7 and 5 each receive 7 points, and the grouping steps 6 and 4 each receive 3 points.

Thereafter, a grouping step having the largest number of evaluation items that each exceed a threshold curvature, or a grouping step having a largest curvature total is selected as a final grouping step, like the pattern 2-1.

{5 Other Modifications}

Embodiment 1 explained above groups image files in units of image files. If an image file consists of a plurality of scenes, the scenes may be grouped. In this case, the start time and duration of each scene are obtained and the scenes are processed like image files, as mentioned above.

<Embodiment 2>

Embodiment 2 according to the present invention uses group information prepared according to Embodiment 1 or other techniques and makes the display controller 160 (FIG. 1) display an index screen on the display unit 300. An image information processing apparatus employed by Embodiment 2 has the same structure as that of Embodiment 1 shown in FIG. 1, and therefore, the following explanation is made with reference to FIG. 1. Embodiment 2, as well as Embodiments 3 and 5 to be explained later are characterized by ways of displaying index screens, and therefore, these embodiments may employ not only the image file grouping techniques of Embodiment 1 but also other image file grouping techniques.

FIGS. 17 to 22 show examples of index screens displayed on the display unit 300 by the display controller 160 according to Embodiment 2 based on group information prepared by the grouping step determination unit 150.

Figure 17:
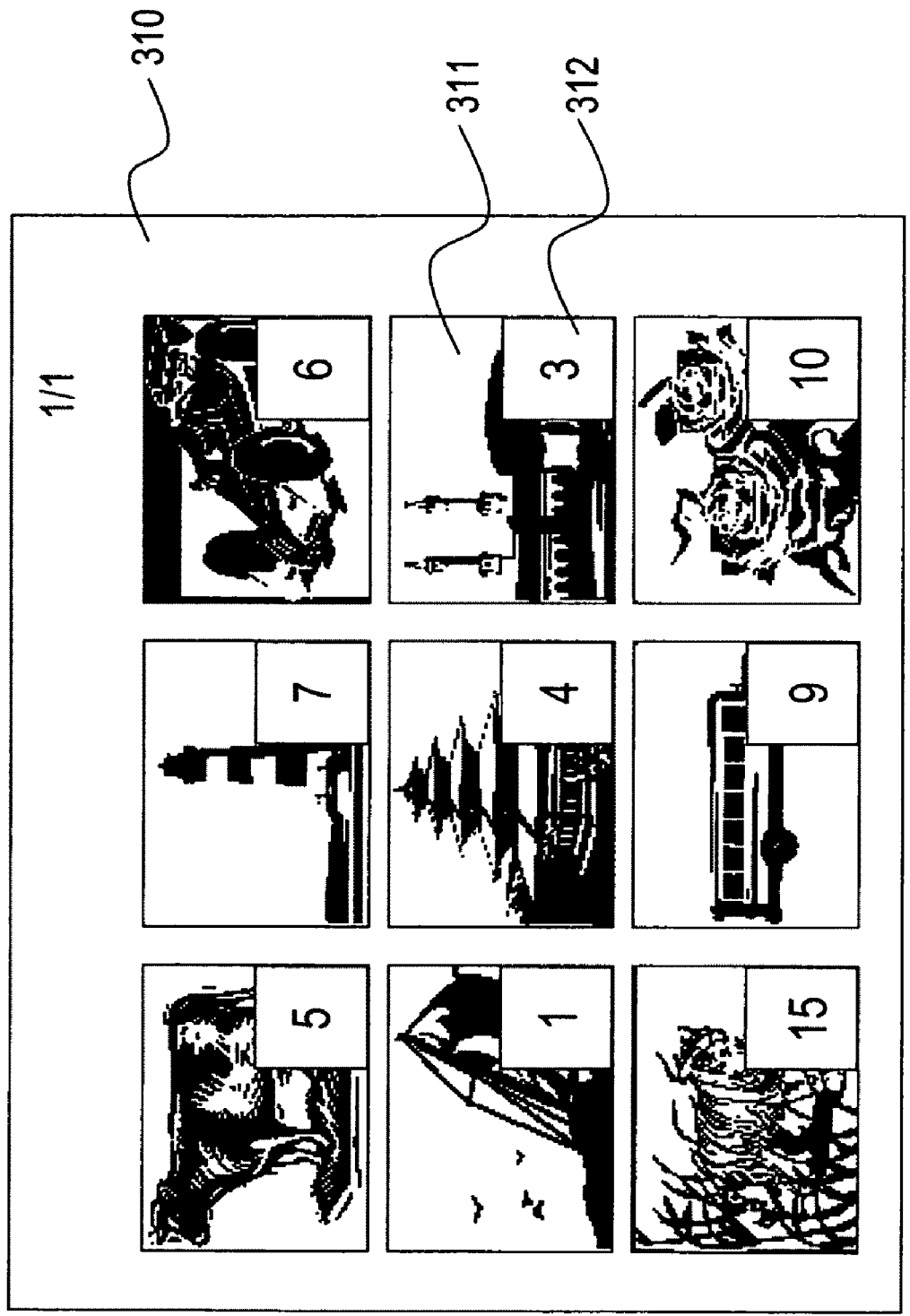
FIG. 17 is a view showing an example of an index screen displayed on a display unit according to Embodiment 2 of the present invention.

FIG. 17 shows an index screen 310 displayed on the display unit 300 according to an example of Embodiment 2.

In FIG. 17, the index screen 310 shows indexes of nine image file groups. Each index corresponds to an image file group and includes a thumbnail image 311 representative of the group and a file count 312 showing the number of files contained in the group. As will be explained later, the thumbnail image 311 may be replaced with textual information including shooting time, a shooting location, contents, and the like.

In FIG. 17, the display unit 300 displays a predetermined number (nine in FIG. 17) of thumbnail images 311 in a matrix of three by three, each thumbnail image representing a group of image files. The number of groups displayed on the display unit 300 at a time is not limited to nine but it is optional. On the display unit 300, it is possible to display, at a time, a single group, two groups, four groups in a matrix of two by two, 12 groups in a matrix of four by three, 16 groups in a matrix of four by four, and the like.

According to Embodiment 2, the display controller 160 obtains the thumbnail image 311 of a given group from image files contained in the group. For example, in case of still images, the thumbnail image 311 may be an image from a first-recorded image file, or an image at an intermediate position in the group. In case of videos, the thumbnail image 311 may be a first image of a first image file in the group, or an image at a proper time point in the group.

According to Embodiment 2, the display controller 160 displays the file count 312 of a group on the thumbnail image 311 of the group, as shown in FIG. 17. Each image file is a single image file that is continuous from the shooting start time to shooting end time of the image file. If a camera is once turned off and is then turned on, another image file is created. If an image file consists of a plurality of scenes, the number of files may be replaced with the number of scenes.

In FIG. 17, the file count 312 of a group 1 is 5, the file count 312 of a group 2 is 7, the file count 312 of a group 3 is 6, . . . , the file count 312 of a group 8 is 9, and the file count 312 of a group 9 is 10. In this way, the display controller 160 displays the thumbnail image 311 for each group and superimposes thereon the file count 312 of the group. The thumbnail images 311 of the nine groups may be arranged according to shooting time, the file counts 312, file names, or the like.

At a right upper part of the index screen 310, there is an indication "1/1." This shows the total number of index screens as a denominator ("1" in FIG. 17) and a number of the presently displayed index screen as a numerator ("1" in FIG. 17).

Figure 18:
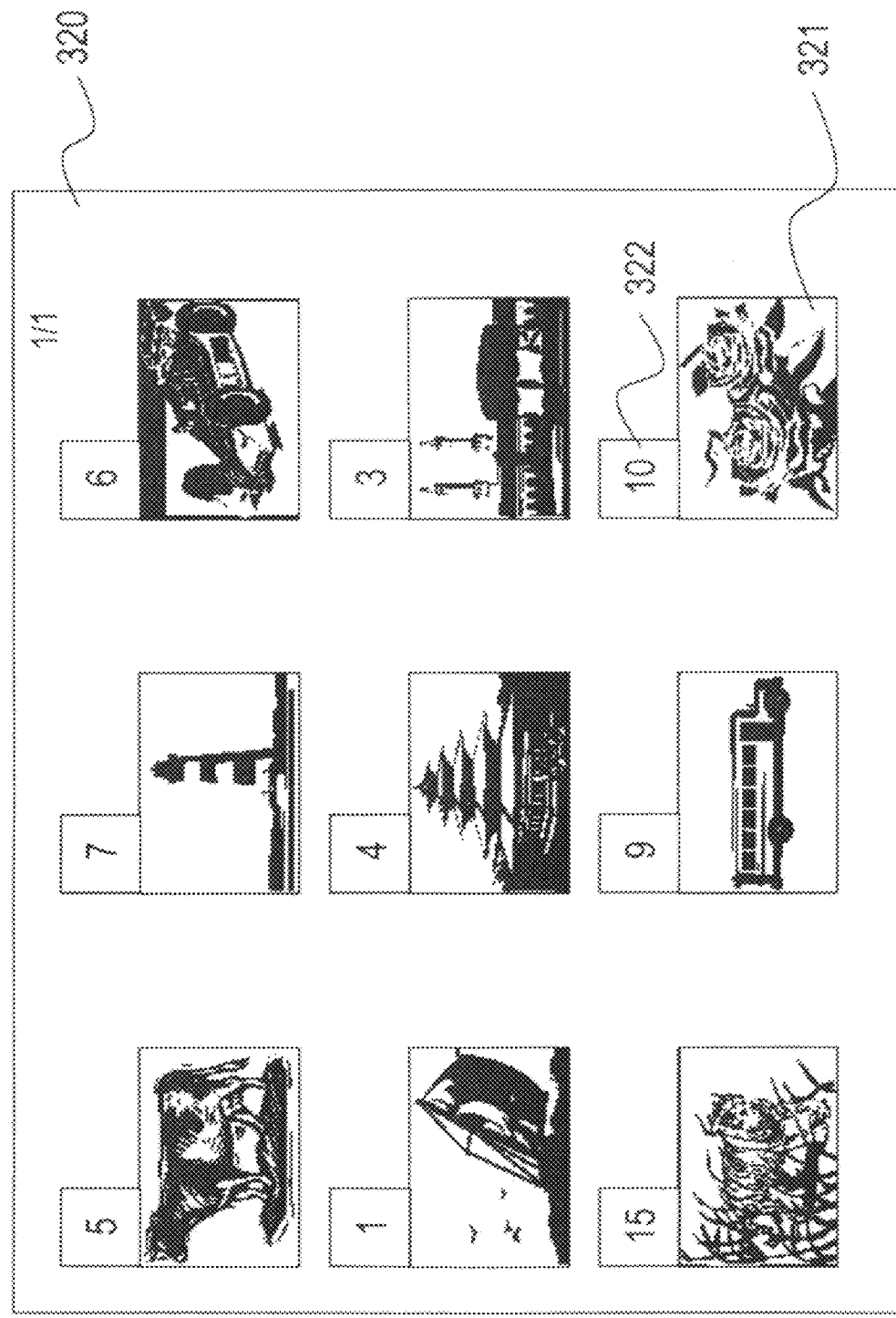
FIG. 18 is a view showing another example of an index screen displayed on a display unit according to Embodiment 2 of the present invention.

FIG. 18 shows an index screen 320 displayed on the display unit 300 according to another example of Embodiment 2.

In FIG. 18, the index screen 320 entirely shows a thumbnail image 321 of each group by displaying a file count 322 of the group on top of the thumbnail image 321. To entirely show the thumbnail image 321, the file count 322 may be placed at the bottom, right, or left of the thumbnail image 321.

Figure 19:
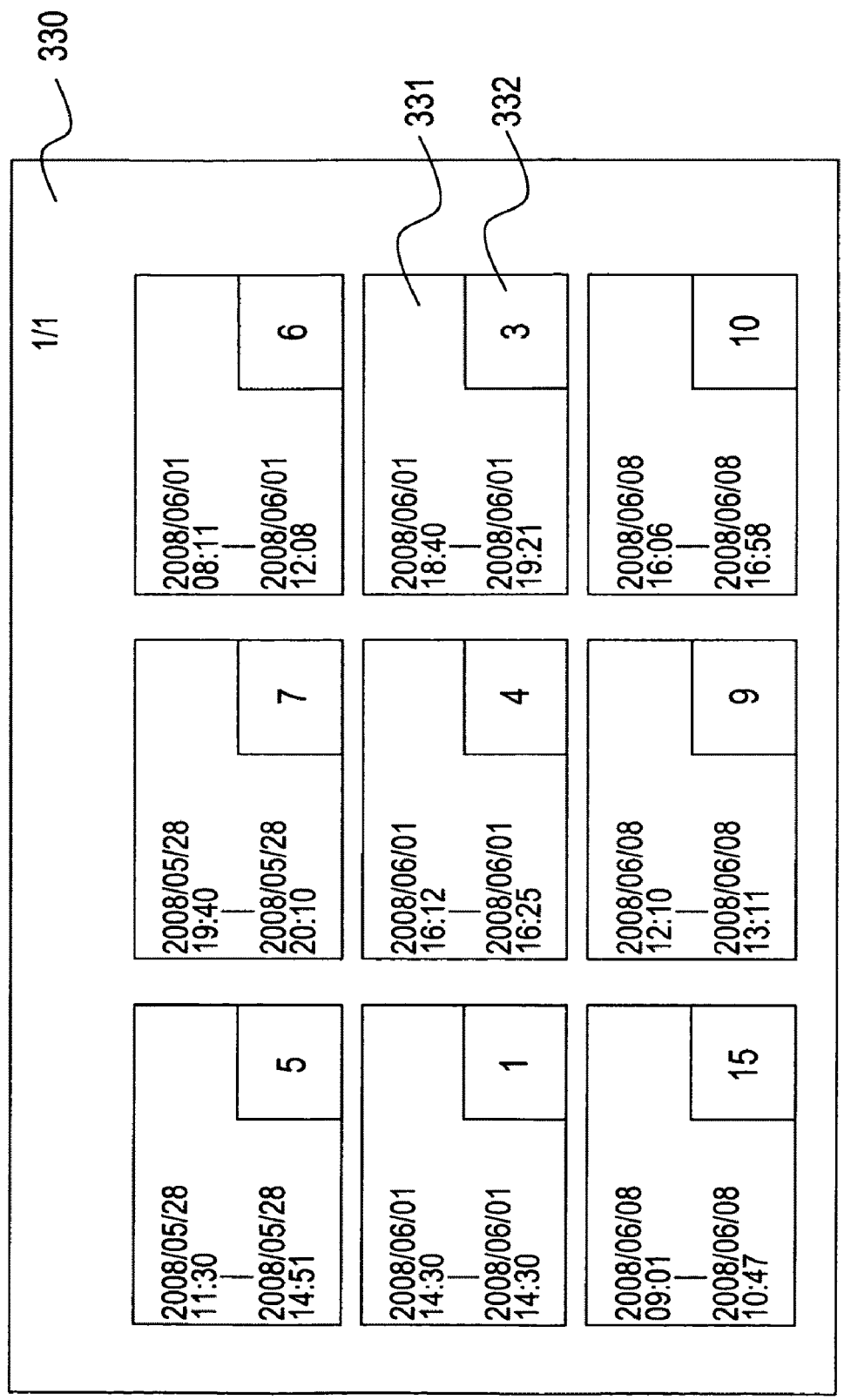
FIG. 19 is a view showing still another example of an index screen displayed on a display unit according to Embodiment 2 of the present invention.

FIG. 19 shows an index screen 330 displayed on the display unit 300 according to still another example of Embodiment 2.

In FIG. 19, the index screen 330 displays, instead of a thumbnail image, textual information 331 showing a shooting period of image files contained in a group as an index of the group. On the textual information 331, a file count 332 of the group is displayed. Like the example of FIG. 18, the file count 332 may be displayed on the top, bottom, left, or right of the textual information 331 so that the textual information 331 is entirely visible. The textual information 331 is prepared by the display controller 160 from shooting start time and shooting end time recorded in each image file contained in each group.

Figure 20:
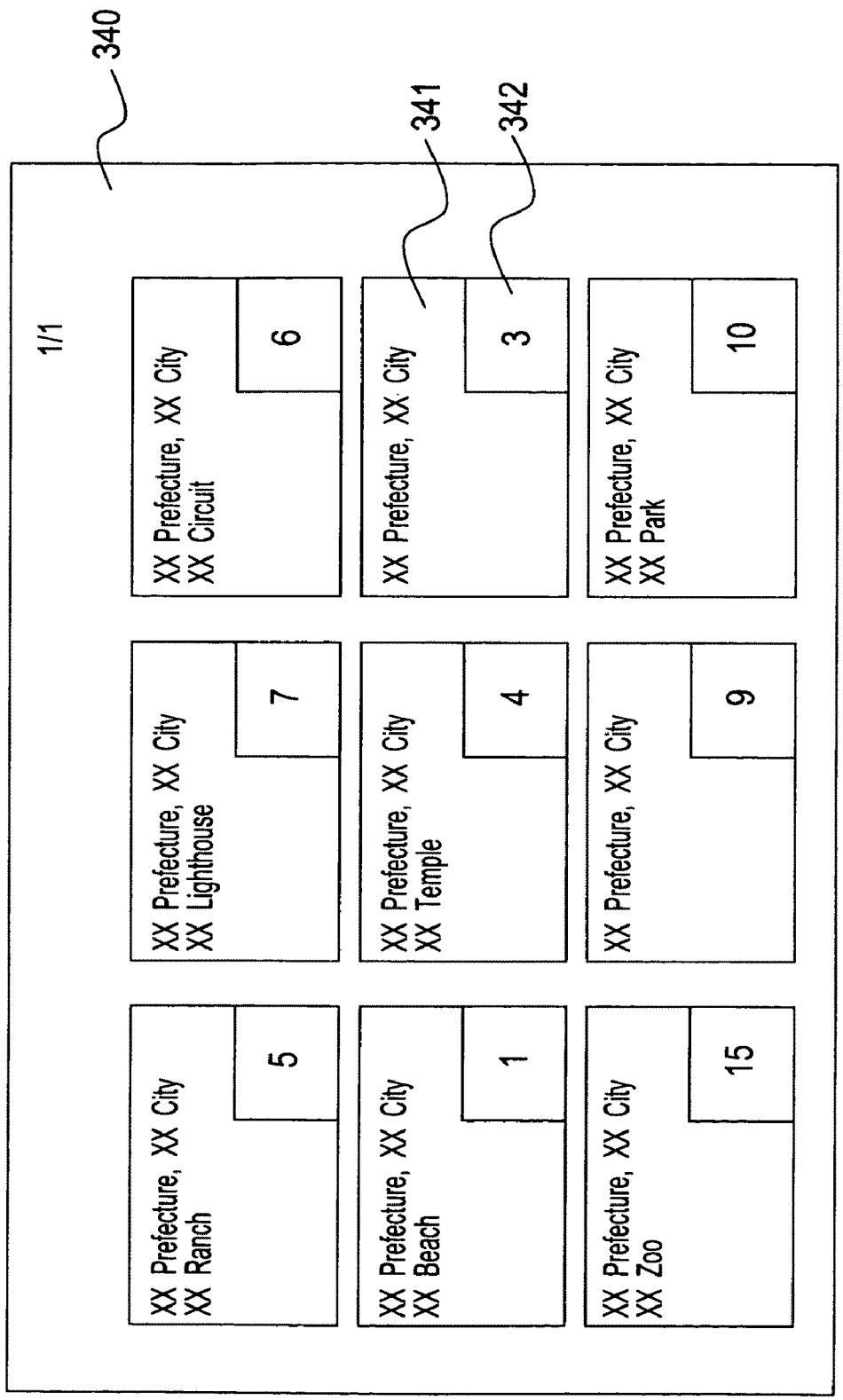
FIG. 20 is a view showing still another example of an index screen displayed on a display unit according to Embodiment 2 of the present invention.

FIG. 20 shows an index screen 340 displayed on the display unit 300 according to still another example of Embodiment 2.

In FIG. 20, the index screen 340 displays textual information 341 including a shooting location and a shooting spot of image files contained in each group as an index of the group. On the textual information 341, a file count 342 of the group is displayed. Like the example of FIG. 18, the file count 342 may be displayed on the top, bottom, left, or right of the textual information 341 so that the textual information 341 is entirely visible. The textual information 341 indicating a shooting location and spot may be entered by the user through the operation receiver 170. If the apparatus 100 (FIG. 1) is provided with a GPS receiver, positional information such as longitude and latitude received by the GPS receiver may be used to find and display the shooting location and spot. It is possible to directly display the received longitude and latitude.

Figure 21:
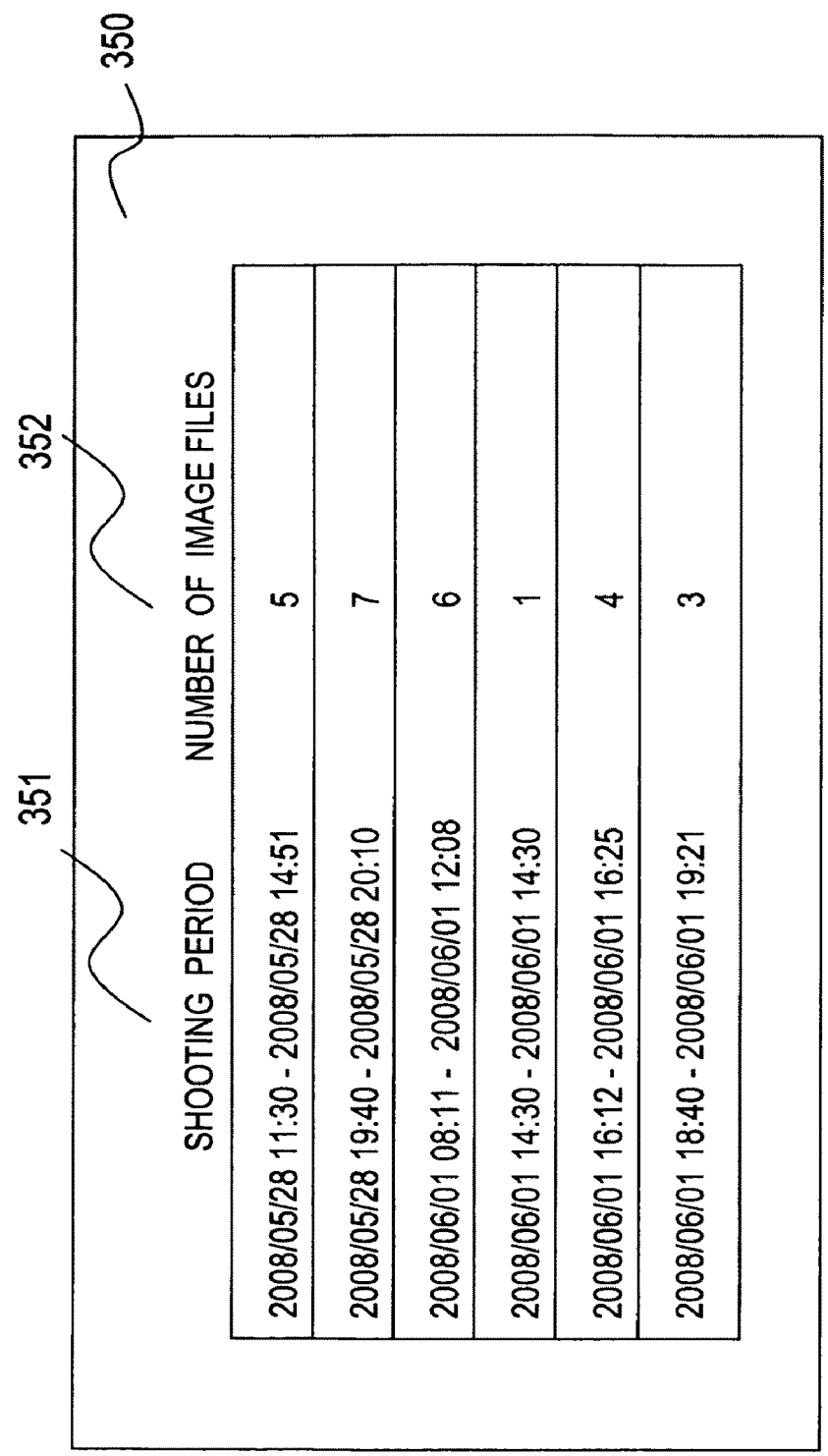
FIG. 21 is a view showing still another example of an index screen displayed on a display unit according to Embodiment 2 of the present invention.

FIG. 21 shows an index screen 350 displayed on the display unit 300 according to still another example of Embodiment 2.

In FIG. 21, the index screen 350 is a list of rows, each row displaying textual information 351 indicating a shooting period of files in each group and a file count 352 of each group. This example can display titles "Shooting period" and "File count" of the list with large fonts, so that the user may easily grasp the meaning of numerals under the titles.

Figure 22:
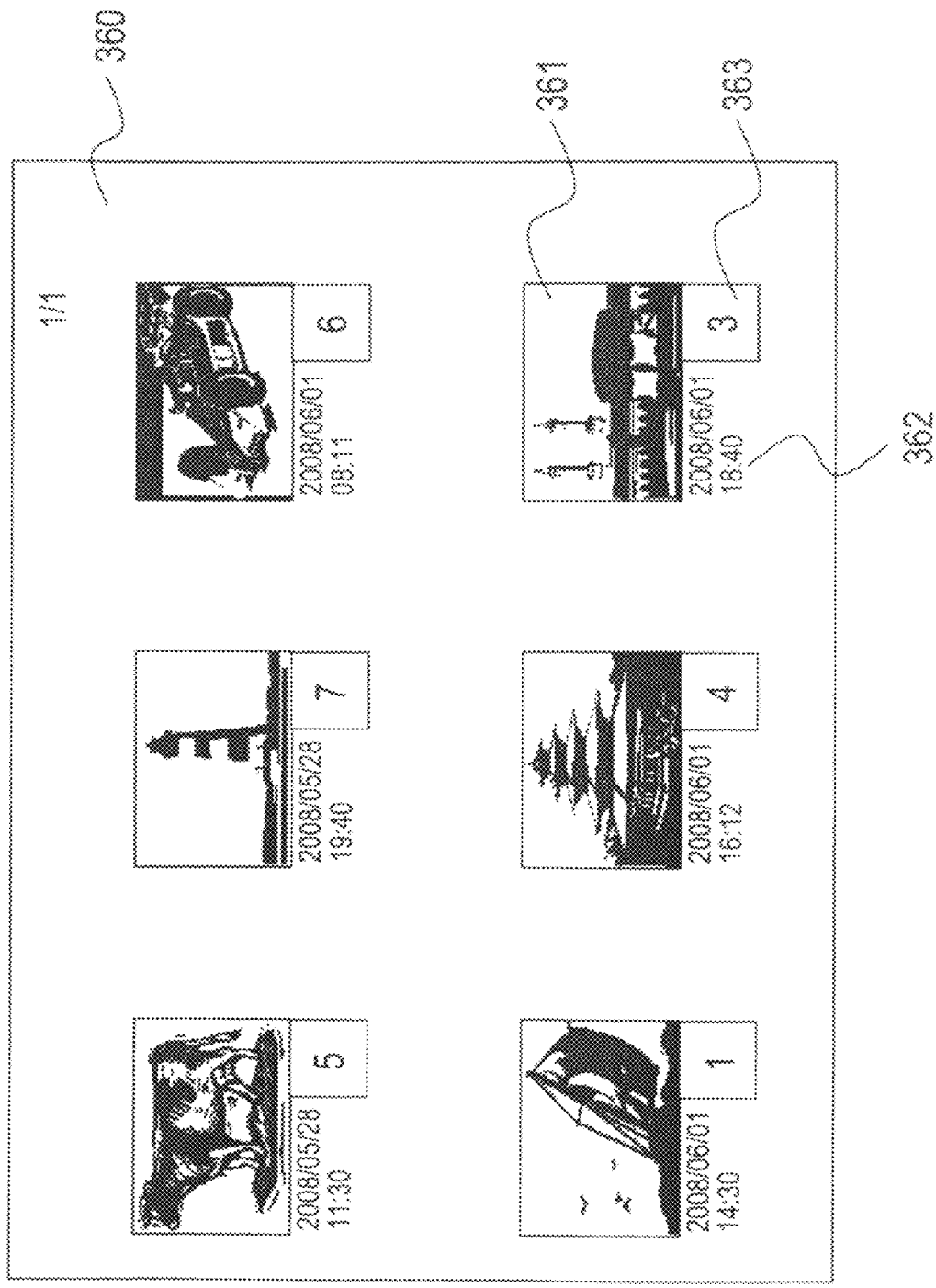
FIG. 22 is a view showing still another example of an index screen displayed on a display unit according to Embodiment 2 of the present invention.

FIG. 22 shows an index screen 360 displayed on the display unit 300 according to still another example of Embodiment 2.

In FIG. 22, the index screen 360 is a combination of the index screen 310 of FIG. 17 and the index screen 330 of FIG. 19. Namely, the index screen 360 displays a thumbnail image 361 representing a group, textual information 362 indicating shooting start time of files contained in the group, and a file count 363 showing the number of the files in the group. The textual information 362 may indicate a shooting period from shooting start time to shooting end time of the files in the group.

In this way, Embodiment 2 displays, on the display unit 300, thumbnail images and/or textual information such as shooting periods and shooting locations as indexes of image files grouped according to Embodiment 1. At this time, Embodiment 2 also displays the number of files contained in each group so that the user may easily grasp the number of image files belonging to each group.

According to Embodiment 2, the number of files contained in each group is displayed as numeric information on a thumbnail image or textual information of the group. The present invention is not limited to this. For example, the number of image files contained in each group may be represented with a bar. Instead of the number of image files belonging to a group, the total shooting time of the image files in the group or the total play time of the image files in the group may be displayed. Alternatively, the number of image files, as well as the total shooting time or total play time of the image files contained in each group may be displayed. When Embodiment 2 makes the display controller 160 display, on the display unit 300, an index screen according to group information prepared according to Embodiment 1, a grouping step determined by the grouping step determination unit 150 may be displayed in a part of the index screen (310, 320, 330, 340, 350, 360 of FIGS. 17 to 22) together with thumbnail images and file counts. For example, if the grouping step determination unit 150 determines the grouping step 9 of FIG. 4 involving nine groups as a final grouping step, the display controller 160 may display "Grouping step 9/16" in a part of the index screen (310 to 360). If the grouping step determination unit 150 determines the grouping step 5 of FIG. 5 involving 12 groups as a final grouping step, the display controller 160 may display "Grouping step 5/16" in a part of the index screen (310 to 360). The denominator "16" is the total number of the grouping steps shown in FIGS. 4 and 5. This allows the user to easily grasp the grouping step presently adopted. It is possible to allow the user to change the presently adopted grouping step to another through the operation receiver 170 on checking the presently adopted grouping step on the display unit 300. It is also possible to allow the user to instruct the grouping step determination unit 150 to change the presently adopted grouping step to another through the operation receiver 170 on checking the presently adopted grouping step displayed in a part of the index screen (310 to 360). Further, with a grouping step change button (not shown) or the like displayed in a part of the index screen (310 to 360), preferably in an upper left part, lower left part, or lower right part, which are easily touched by a finger of the user, it is possible to allow the user to operate the grouping step change button so that the grouping step determination unit 150 may change the presently adopted grouping step to another.

In FIG. 17, the file count 312 is overlaid on the thumbnail image 311. In this case, the thumbnail image 311 of each group is partly hidden under the file count 312. To cope with this inconvenience, the display controller 160 may display the index screen 310 with the file counts 312 being displayed only for a predetermined period, for example, several seconds and then being turned off. Alternatively, the file counts 312 may be turned off according to an instruction from the user made through the operation receiver 170.

<Embodiment 3>

Embodiment 3 according to the present invention switches index screens from one to another on the display unit 300.

Switching index screens is carried out according to, for example, a button operation conducted by the user through the operation receiver 170.

Figure 23:
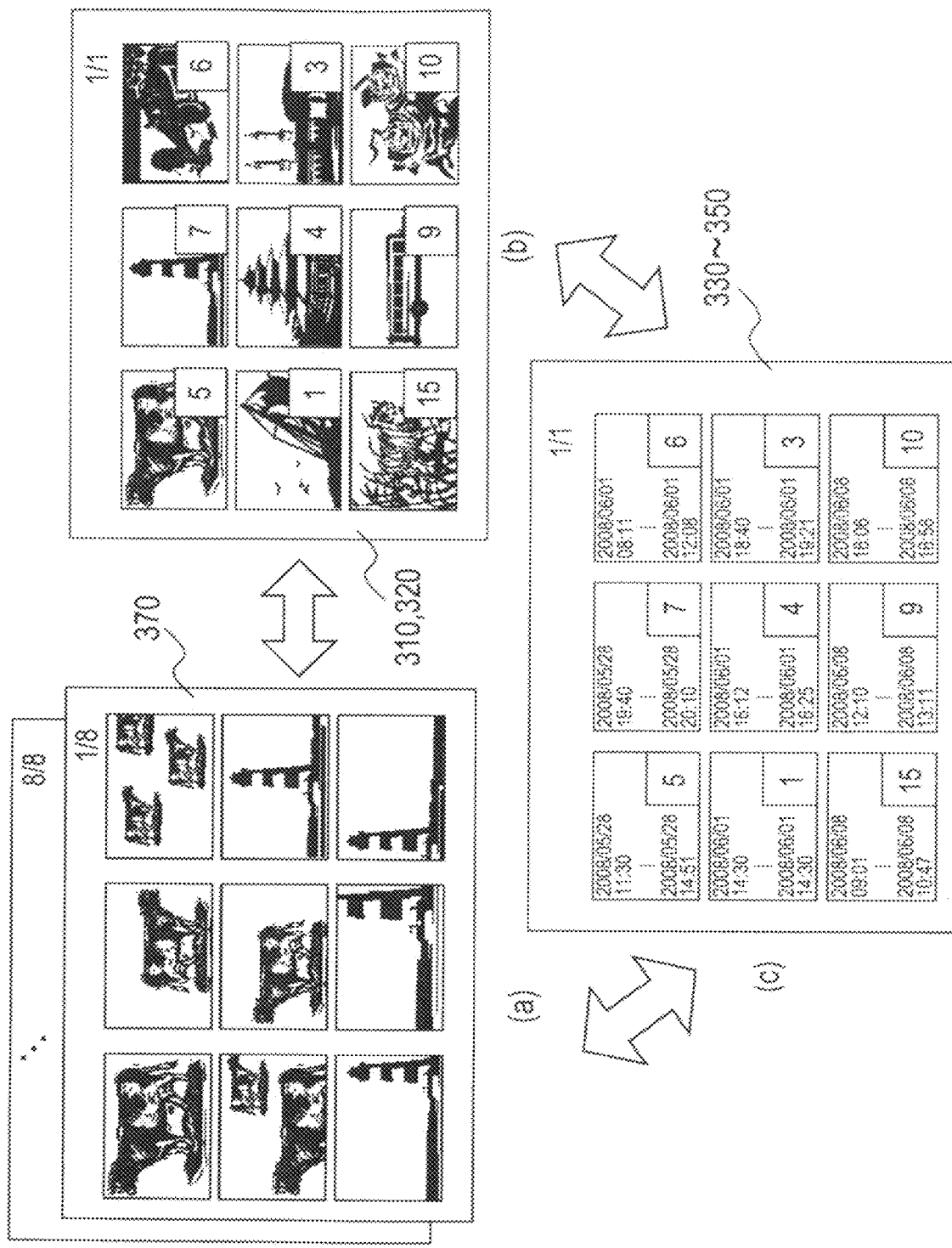
FIG. 23 is a view showing examples of index screens that are switched from one to another by a display controller 160 (FIG. 1), according to Embodiment 3 of the present invention.

FIG. 23 shows an example of index screen switching conducted by the display controller 160 (FIG. 1) according to Embodiment 3.

In FIG. 23, a view (a) shows index screens 370 that display thumbnail images of all image files not grouped, a view (b) shows the index screen 310 of FIG. 17 (or 320 of FIG. 18) that displays thumbnail images each representing a group of image files, and a view (c) shows the index screen 330 of FIG. 19 (or 340 or 350 of FIGS. 20 and 21) that displays textual information such as a shooting period and a shooting location concerning each group. Embodiment 3 switches the views (a), (b), and (c) from one to another on the display unit 300. Index screens switched on the display unit 300 according to Embodiment 3 are not limited to those shown in the views (a), (b), and (c) of FIG. 23. For example, the index screen 360 of FIG. 22 according to Embodiment 2 may be included in the index screens that are switched from one to another on the display unit 300. Any other index screens may be included in the index screens to be switched from one to another on the display unit 300. The number of index screens to be switched from one to another is not limited to three. For example, the two views (a) and (b), or (a) and (c), or (b) and (c) may be switched between them on the display unit 300. Instead, four or more index screens may be switched from one to another on the display unit 300. The index screens 370 shown in the view (a) of FIG. 23 display all image files that are not grouped. The eight index screens 370 numbered from 1/8 to 8/8 include thumbnail images of all image files.

The user can optionally switch the index screens shown in the views (a) to (c) of FIG. 23 from one to another through the operation receiver 170. The user may choose the index screens 370 of the view (a) of FIG. 23 containing all image files if the number of the image files is small, or the index screen 310 (320) of the view (b) of FIG. 23 containing thumbnail images each representing a group of image files if the number of image files is large and if the user intends to retrieve an objective image file according to the contents of the image file, or the index screen 330 (340, 350) of the view (c) of FIG. 23 containing textual information such as a shooting interval and a shooting location for each group of image files if the user intends to retrieve an objective image file according to the shooting time or shooting location of the image file. By switching the views (a) to (c) of FIG. 23 from one to another, the user can speedily retrieve an objective image file from many image files.

Figure 24:
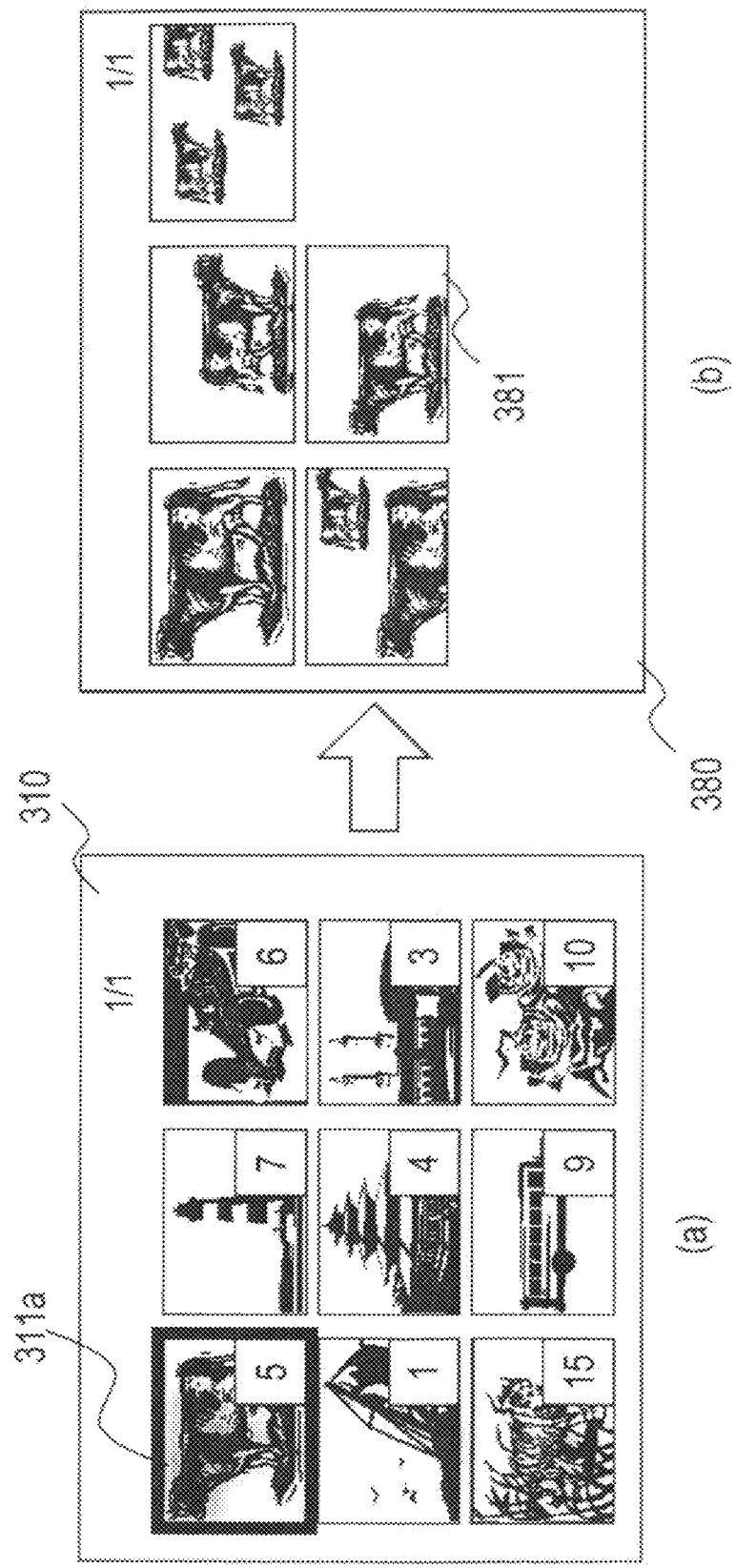
FIG. 24 is a view showing other examples of index screens that are switched from one to another by the display controller 160, according to Embodiment 3 of the present invention.

FIG. 24 shows another example of index-screen switching conducted by the display controller 160 according to Embodiment 3.

In FIG. 24, a view (a) shows an index screen 310 displaying thumbnail images each representing a group of image files. If the user selects a thumbnail image 311a in the index screen 310, the display controller 160 displays an index screen 380 shown in a view (b) of FIG. 24 on the display unit 300, the index screen 380 displaying thumbnail images 381 of all image files contained in the group related to the thumbnail image 311a selected by the user. The group represented with the thumbnail image 311a shown in the index screen 310 of the view (a) of FIG. 24 contains five image files, and therefore, the index screen 380 shown in the view (b) of FIG. 24 displays the five thumbnail images 381 representing the five image files belonging to the group.

In this way, Embodiment 3 switches index screens such as those shown in FIGS. 23 and 24 from one to another according to a user's request. Embodiment 3 allows the user to easily retrieve an objective image file from among a large number of image files.

<Embodiment 4>

Embodiment 4 according to the present invention sets an upper limit on the number of image files contained in each group when the grouping step determination unit 150 determines a grouping step according to any one of Embodiments 1 to 3.

Figure 25:
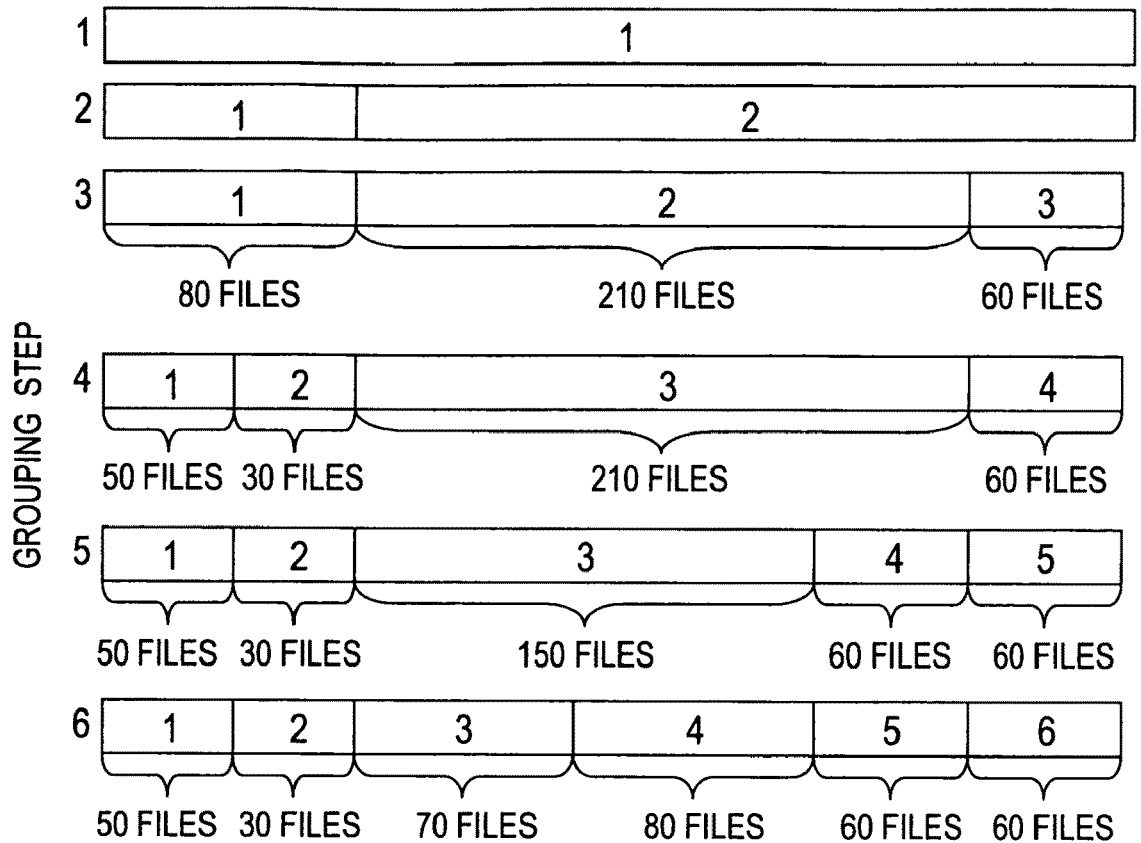
FIG. 25 is a view showing an example of again determining a grouping step according to an upper limit number of files allowed in each group, according to Embodiment 4 of the present invention.

FIG. 25 is a view showing an example of again determining a grouping step based on an upper limit of, for example, 100 set on the number of image files included in each group, according to Embodiment 4.

In the example of FIG. 25, the grouping step determination unit 150 selects a grouping step 3 as an optimum grouping step at first. The grouping step 3 forms a group 1 containing 80 files, a group 2 containing 210 files, and a group 3 containing 60 files.

The number of image files in the group 2 is larger than the upper limit of 100 that is set as an upper limit for the number of indexes to be displayed on the display unit 300. In this case, the grouping step determination unit 150 again determines a grouping step so that each group may contain 100 files or lower.

For this, the grouping process may be advanced until each group contains 100 files or lower. In FIG. 25, the grouping step determination unit 150 determines a grouping step 6 as an optimum grouping step because each group formed in the grouping step 6 includes 100 files or lower. In the grouping step 6, the grouping unit 130 divides image files into six groups as shown in FIG. 25.

Figure 26:
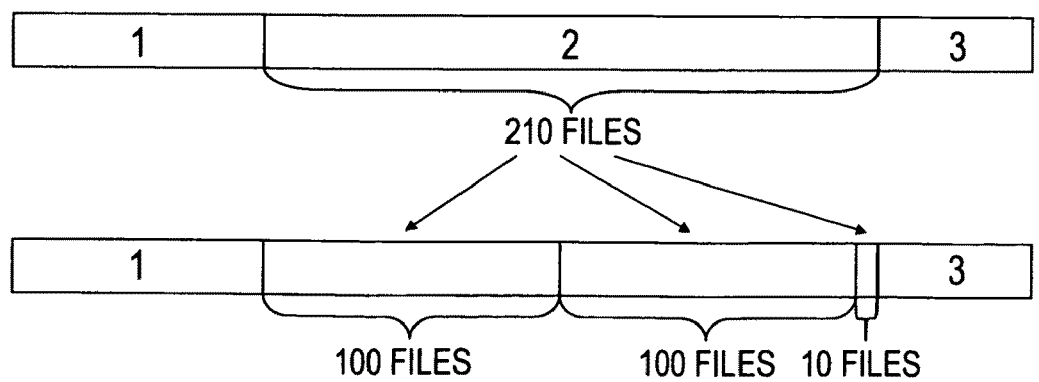
FIG. 26 is a view showing another example of again determining a grouping step according to an upper limit number of files allowed in each group, according to Embodiment 4 of the present invention.

Instead of changing the once-determined grouping step to another, the grouping step determination unit 150 may further divide the group that includes 100 or more files so that no group contains more than 100 files. An example of this is shown in FIG. 26. In FIG. 26, the group 2 formed in the grouping step 3 of FIG. 25 contains 210 files. Only the group 2 is divided into smaller groups so that each group may contain 100 or less files. In the example of FIG. 26, the grouping unit 130 separates the 210 files in the group 2 100 by 100 from the head of the group. Namely, the grouping unit 130 divides the group 2 of 210 files prepared in the grouping step 3 into three groups, i.e., two groups each containing 100 files and a group containing 10 files.

Figure 27:
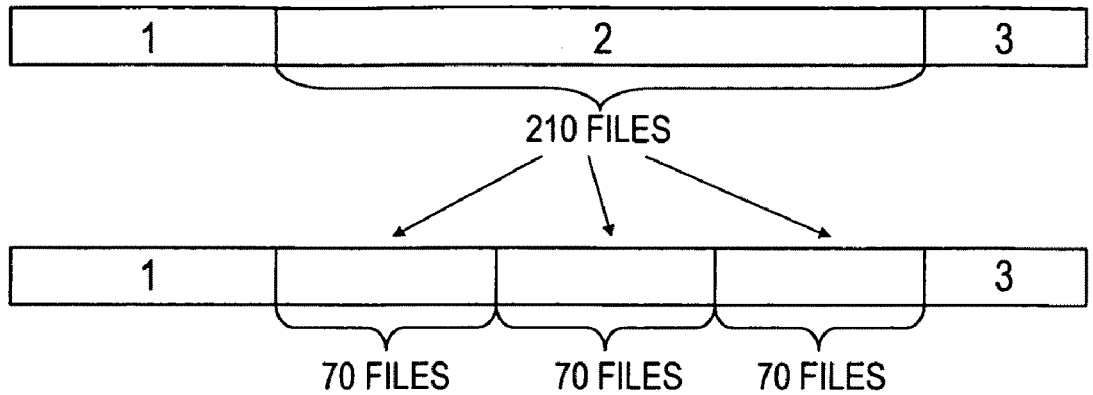
FIG. 27 is a view showing still another example of again determining a grouping step according to an upper limit number of files allowed in each group, according to Embodiment 4 of the present invention.

FIG. 27 shows another example according to Embodiment 4. In this example, the grouping unit 130 divides the group 2 whose number of files exceeds the upper limit of 100 into groups having an equal number of files. Namely, the grouping unit 130 divides the group 2 of 210 files into three groups each containing 70 files.

Figure 28:
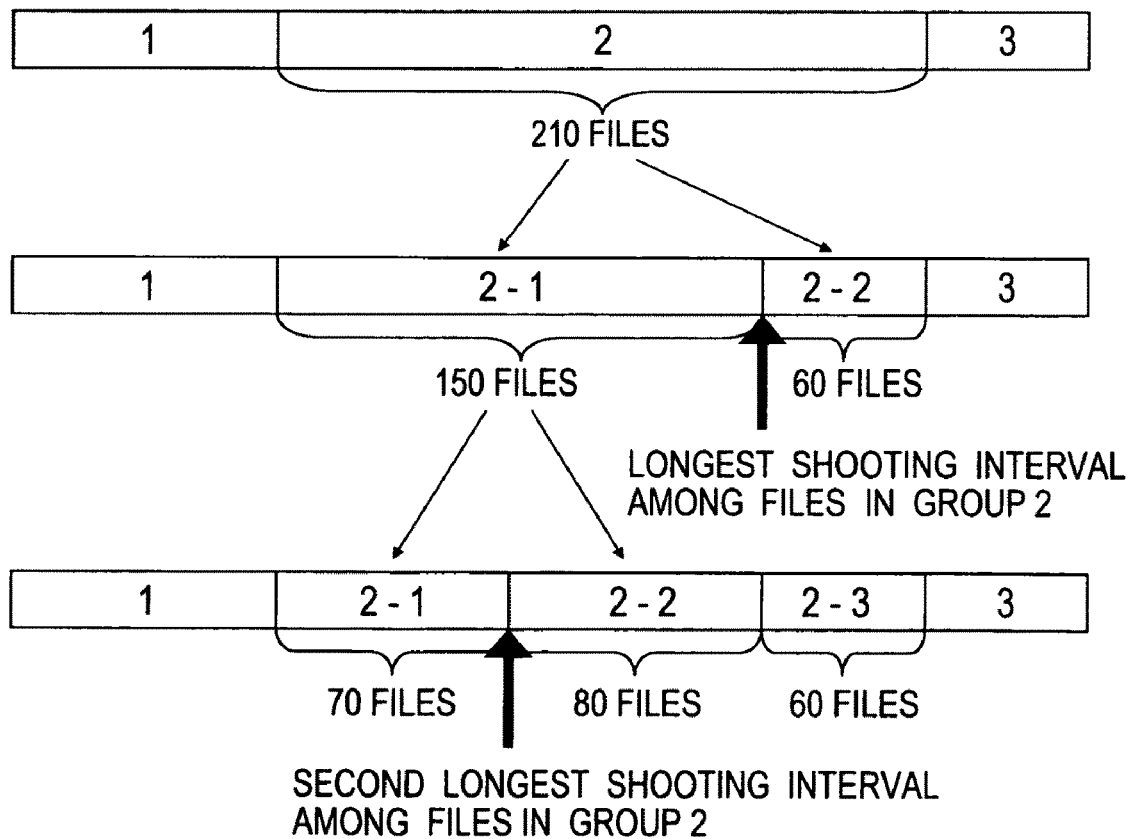
FIG. 28 is a view showing still another example of again determining a grouping step according to an upper limit number of files allowed in each group, according to Embodiment 4 of the present invention.

FIG. 28 shows still another example according to Embodiment 4. According to this example, the grouping unit 130 divides a group having more than 100 files into two at a longest shooting interval among the files in the group and repeats this operation until each group has 100 or less files. For example, the group 2 is divided into two groups 2-1 and 2-2 at a longest shooting interval. The group 2-1 contains 150 files and the group 2-2 60 files. The group 2-1 still exceeds the upper limit of 100 files, and therefore, the group 2-1 is divided into two at a second longest shooting interval of the group 2. As a result, the group 2 is divided into three groups 2-1, 2-2, and 2-3 each containing less than 100 files.

According to Embodiment 4, the grouping step determination unit 150 checks the number of files in each group, and if there is a group containing files exceeding an upper limit, the unit 150 again determines an optimum grouping step or the groping unit 130 again groups the files, so that every group may have files whose number is smaller than the upper limit.

<Embodiment 5>

Embodiment 5 according to the present invention sets an upper limit on the number of groups formed in a grouping step that is determined by the grouping step determination unit 150 according to any one of Embodiments 1 to 3, and if the number of groups formed in the determined grouping step is larger than the upper limit, again determines a grouping step. Alternatively, Embodiment 5 changes a maximum number of indexes to be displayed, according to the number of groups formed in a grouping step determined by the grouping step determination unit 150.

An example according to Embodiment 5 will be explained. If a maximum number of indexes to be displayed on the display unit 300 is nine (as shown in FIG. 17), the display controller 160 according to Embodiment 5 sends the maximum index number of 9 to the grouping step determination unit 150.

If the grouping step determination unit 150 determines, as a final grouping step, a grouping step involving 10 or more groups, thumbnail images representative of the groups are unable to be displayed in one index screen 310. In this case, the grouping step determination unit 150 according to Embodiment 5 again determines a grouping step or again groups files so that the number of groups becomes nine. Instead of repeating the grouping step determination, it is possible, from the beginning, to determine a grouping step that forms nine groups at most, or divide files into groups within the upper limit number of groups.

For example, if a maximum number of indexes to be displayed on the display unit 300 is nine and if the grouping step determination unit 150 determines, as a final grouping step, the grouping step 12 of FIG. 4 that forms 12 groups, the unit 150 may change the determination to the grouping step 9 that forms 9 groups. Similarly, if the unit 150 determines the grouping step 5 of FIG. 5 that forms 12 groups, the unit 150 may change the determination to the grouping step 8 of FIG. 5 that forms 9 groups.

If the determined grouping step forms groups whose number is less than the maximum index number of 9, the grouping step determination unit 150 according to Embodiment 5 may leave the determination as it is. Alternatively, the unit 150 may again determine another grouping step or may again group files so that the number of groups becomes equal to the maximum index number of 9. Instead of repeating the grouping step determination, it is possible to determine a grouping step or group files so that nine groups are formed from the beginning.

For example, if a displayable maximum index number is nine and if the grouping step determination unit 150 determines the grouping step 4 of FIG. 4 that forms four groups, the unit 150 may change the determination to the grouping step 9 of FIG. 4 that forms nine groups. Similarly, if the unit 150 determines the grouping step 14 of FIG. 5 that forms three groups, the unit 150 may change the determination to the grouping step 8 of FIG. 5 that forms nine groups.

If the number of groups formed by a grouping step determined by the grouping step determination unit 150 is smaller than the maximum displayable index number, the grouping step determined by the unit 150 may be unchanged and the display controller 160 may change the maximum displayable index number so that the index of every group may be displayed in a larger size. For example, if the unit 150 determines as a final grouping step the grouping step 4 of FIG. 4 that forms four groups, the display controller 160 changes the maximum displayable index number of 9 to 4 with which indexes of the four groups are displayed in a maximum size. Similarly, if the unit 150 determines the grouping step 14 of FIG. 5 that forms three groups, the display controller 160 changes the maximum displayable index number from 9 to 4 or 3 with which indexes of the three groups are displayed in a maximum size.

According to Embodiment 5, the grouping step determination unit 150 again determines a grouping step or the grouping unit 130 again groups files, according to a maximum number of indexes to be displayed on the display unit 300. In addition to the effects of Embodiments 1 to 3, Embodiment 5 provides an effect of allowing the user to efficiently grasp grouped image files in a single screen.

As mentioned above, Embodiment 5 repeats the determination of a grouping step or the grouping of files according to a maximum number of indexes displayable in one screen on the display unit 300. Since the number of indexes to be displayed in a screen on the display unit 300 is changeable among 2, 4, 16, . . . , and therefore, the number of indexes to be displayed in a screen instead of the maximum number of indexes displayable in a screen may be employed when determining a grouping step or when grouping files.

It should be understood that many modifications and adaptations of the invention will become apparent to those skilled in the art and it is intended to encompass such obvious modifications and changes in the scope of the claims appended hereto.

What is claimed is:

1. An apparatus for processing image information regarding image data pieces each having retrievable information including shooting, comprising:
a grouping unit configured to group the image data pieces, which are arranged in order of the shooting time, by sequentially carrying out grouping steps that each divide or merge the image data pieces into groups according to shooting intervals;
an evaluation unit configured to calculate a score for each of the grouping steps according to an evaluation item based on a sum of shooting durations of the image data pieces belonging to each group obtained by each of the grouping steps; and
a determination unit configured to determine a specific one of the grouping steps according to the calculated scores.

2. An apparatus for processing image information regarding image data pieces each having retrievable information including shooting time and a shooting interval, comprising:
a grouping unit configured to group the image data pieces, which are arranged in order of the shooting time, by sequentially carrying out grouping steps that each divide or merge the image data pieces into groups according to the shooting intervals;
an evaluation unit configured to calculate a score for each of the grouping steps according to one or a plurality of predetermined evaluation items; and
a determination unit configured to determine a specific one of the grouping steps according to the calculated scores, wherein:
the determination unit determines a specific one of the grouping steps according to gradient variations representative of the grouping steps on a function that is based on the calculated scores.

3. An apparatus for processing image information regarding image data pieces each having retrievable information including shooting time and a shooting interval, comprising:
a grouping unit configured to group the image data pieces, which are arranged in order of the shooting time, by sequentially carrying out grouping steps that each divide or merge the image data pieces into groups according to the shooting intervals;

an evaluation unit configured to calculate a score for each of the grouping steps according to one or a plurality of predetermined evaluation items; and
a determination unit configured to determine a specific one of the grouping steps according to the calculated scores, wherein:
the determination unit determines a specific one of the grouping steps according to curvatures representative of the grouping steps on a curve that is defined by the calculated scores.

4. The apparatus of claim 1, further comprising:
a display control unit configured to display selectable indexes that correspond to groups of the image data pieces, respectively, the groups being formed in the determined specific grouping step.

5. The apparatus of claim 4, wherein:
if one of the indexes is selected, the display control unit displays images representative of the image data pieces contained in the group corresponding to the selected index.

6. The apparatus of claim 4, wherein:
the display control unit displays the number of image data pieces contained in each group, together with the index corresponding to the image data pieces in the group.

7. The apparatus of claim 6, wherein:
the display control unit displays a thumbnail image obtained from image data pieces contained in each group, as the index corresponding to the image data pieces contained in the group.

8. The apparatus of claim 6, wherein:
the display control unit displays textual information obtained from image data pieces contained in each group, as the index corresponding to the image data pieces contained in the group.

9. The apparatus of claim 1, wherein:
the determination unit presets an upper limit for the number of image data pieces in each group and again determines a specific one of the grouping steps so that the number of image data pieces in each group formed in the specific grouping step may not exceed the upper limit.

10. The apparatus of claim 1, wherein:
the display control unit sends a maximum number of indexes displayable in a display screen to the determination unit; and
the determination unit again determines a specific one of the grouping steps so that groups formed in the specific grouping step may keep the maximum number of indexes.

11. An apparatus for processing image information regarding image data pieces each having retrievable information including shooting time and a shooting interval, comprising:
a grouping unit configured to group the image data pieces, which are arranged in order of the shooting time, by sequentially carrying out grouping steps that each divide or merge the image data pieces into groups according to the shooting intervals;
a first evaluation unit configured to calculate a first score for each of the grouping steps according to one or a plurality of predetermined first evaluation items;
a second evaluation unit configured to calculate a second score for each of the grouping steps according to one or a plurality of predetermined second evaluation items; and
a determination unit configured to find curvatures representative of the grouping steps on a curve that is defined by the first scores, find grouping steps corresponding to minimal values of the second scores, and determine a specific one of the grouping steps according to the curvatures and the minimal-value-corresponding grouping steps.

12. The apparatus of claim 11, further comprising:
a display control unit configured to display selectable indexes that correspond to groups of the image data pieces, respectively, the groups being formed in the determined specific grouping step.

13. The apparatus of claim 12, wherein:
if one of the indexes is selected, the display control unit displays images representative of the image data pieces contained in the group corresponding to the selected index.

14. The apparatus of claim 12, wherein:
the display control unit displays the number of image data pieces contained in each group, together with the index corresponding to the image data pieces in the group.

15. The apparatus of claim 14, wherein:
the display control unit displays a thumbnail image obtained from image data pieces contained in each group, as the index corresponding to the image data pieces contained in the group.

16. The apparatus of claim 14, wherein:
the display control unit displays textual information obtained from image data pieces contained in each group, as the index corresponding to the image data pieces contained in the group.

17. The apparatus of claim 11, wherein:
the determination unit presets an upper limit for the number of image data pieces in each group and again determines a specific one of the grouping steps so that the number of image data pieces in each group formed in the specific grouping step may not exceed the upper limit.

18. The apparatus of claim 11, wherein:
the display control unit sends a maximum number of indexes displayable in a display screen to the determination unit; and
the determination unit again determines a specific one of the grouping steps so that groups formed in the specific grouping step may keep the maximum number of indexes.

19. A method of processing image information in an apparatus for processing image information regarding image data pieces each having retrievable information including shooting time, the method comprising:
grouping the image data pieces, which are arranged in order of the shooting time, by sequentially carrying out grouping steps that each divide or merge the image data pieces into groups according to shooting intervals;
calculating a score for each of the grouping steps according to an evaluation item based on a sum of shooting durations of the image data pieces belonging to each group obtained by each of the grouping steps; and
determining a specific one of the grouping steps according to the calculated scores.

20. The apparatus of claim 1, wherein:
the evaluation unit uses an evaluation item based on average and variance of the sum of shooting durations of the image data pieces belonging to each group obtained by each of the grouping steps.

21. An apparatus for processing image information regarding image data pieces each having retrievable information including shooting time, comprising:
a grouping unit configured to group the image data pieces, which are arranged in order of the shooting time, by sequentially carrying out grouping steps that each divide or merge the image data pieces into groups according to shooting intervals;

an evaluation unit configured to calculate a score for each of the grouping steps according to an evaluation item based on central time in each group obtained by each of the grouping steps; and a determination unit configured to determine a specific one of the grouping steps according to the calculated scores.

22. An apparatus for processing image information regarding image data pieces each having retrievable information including shooting time, comprising:

a grouping unit configured to group the image data pieces, which are arranged in order of the shooting time, by sequentially carrying out grouping steps that each divide or merge the image data pieces into groups according to shooting intervals;

an evaluation unit configured to calculate a score for each of the grouping steps according to an evaluation item based on a variance of shooting intervals among the image data pieces belonging to each group obtained by each of the grouping steps; and a determination unit configured to determine a specific one of the grouping steps according to the calculated scores, wherein:

the determination unit determines a specific one of the grouping steps from among those whose calculated scores take minimal values.

23. A method of processing image information in an apparatus for processing image information regarding image data pieces each having retrievable information including shooting time and a shooting interval, comprising:

grouping the image data pieces, which are arranged in order of the shooting time, by sequentially carrying out grouping steps that each divide or merge the image data pieces into groups according to the shooting intervals;

calculating a first score for each of the grouping steps according to one or a plurality of predetermined first evaluation items;

calculating a second score for each of the grouping steps according to one or a plurality of predetermined second evaluation items;

finding curvatures representative of the grouping steps on a curve that is defined by the first scores;

finding grouping steps corresponding to minimal values of the second scores; and determining a specific one of the grouping steps according to the curvatures and the minimal-value-corresponding grouping steps.

* * * * *